(12) United States Patent
Babazaki et al.

(10) Patent No.: US 12,694,560 B2
(45) Date of Patent: Jul. 28, 2026

(54) ESTIMATION DEVICE, ESTIMATION METHOD, AND STORAGE MEDIUM

(71) Applicant: NEC Corporation, Tokyo (JP)

(72) Inventors: Yasunori Babazaki, Tokyo (JP);
Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 307 days.

(21) Appl. No.: 18/276,214

(22) PCT Filed: Feb. 18, 2021

(86) PCT No.: PCT/JP2021/006119
§ 371 (c)(1),
(2) Date: Aug. 8, 2023

(87) PCT Pub. No.: WO2022/176104
PCT Pub. Date: Aug. 25, 2022

(65) Prior Publication Data
US 2024/0104765 A1 Mar. 28, 2024

(51) Int. Cl.
*G06V 40/10* (2022.01)
*G06T 7/73* (2017.01)
(Continued)

(52) U.S. Cl.
CPC ................ *G06T 7/73* (2017.01); *G06V 10/44* (2022.01); *G06V 10/762* (2022.01); *G06V 40/10* (2022.01);
(Continued)

(58) Field of Classification Search
CPC ............. G06T 7/73; G06T 2207/30244; G06T 2207/30196; G06V 10/762; G06V 40/10; G06V 10/44
See application file for complete search history.

(56) References Cited

U.S. PATENT DOCUMENTS

| | | | | |
|---|---|---|---|---|
| 6,151,411 A | * | 11/2000 | Saito ..................... | G06V 10/42 348/580 |
| 2007/0195996 A1 | * | 8/2007 | Kitamura ............. | G06V 40/165 382/103 |
| 2016/0357840 A1 | * | 12/2016 | Odashima ............. | G06F 16/283 |

FOREIGN PATENT DOCUMENTS

| | | | | |
|---|---|---|---|---|
| JP | H09179988 A | * | 3/1999 | |
| JP | H11191160 A | * | 7/1999 | ............. G06V 10/42 |

(Continued)

OTHER PUBLICATIONS

JP Office Communication for JP Application No. 2023-500218, mailed on Apr. 22, 2025 with English Translation.

(Continued)

*Primary Examiner* — Shaghayegh Azima
(74) *Attorney, Agent, or Firm* — Sughrue Mion, PLLC

(57) ABSTRACT

An estimation device 3X mainly includes a feature point estimation means 35X, a representative point candidate determination means 37X, and a representative point estimation means 38X. The feature point estimation means 35X estimates plural feature points relating to an object. The representative point candidate determination means 37X determines plural representative point candidates that are candidates of a representative point of the object based on the plural feature points. The representative point estimation means 38X estimates the representative point based on the plural representative point candidates.

12 Claims, 15 Drawing Sheets

(51) Int. Cl.
    *G06V 10/44*        (2022.01)
    *G06V 10/762*     (2022.01)

(52) U.S. Cl.
    CPC .............. *G06T 2207/30196* (2013.01); *G06T 2207/30242* (2013.01)

(56)             References Cited

FOREIGN PATENT DOCUMENTS

| | | | | | |
|---|---|---|---|---|---|
| JP | 2005038121 | A | * | 2/2005 | ........... G06V 10/753 |
| JP | 2012083855 | A | * | 4/2012 | |
| JP | 2015191626 | A | * | 11/2015 | |
| JP | 2020-155089 | A | | 9/2020 | |

OTHER PUBLICATIONS

Jianan Zhen, Qi Fang, Jiaming Sun, Wentao Liu, Wei Jiang, Hujun Bao, Xiaowei Zhou, "SMAP: Single-Shot Multi-Person Absolute 3D Pose Estimation", arXiv:2008.11469v1 [cs.valve flow coefficient], Aug. 26, 2020, <URL:https://arxiv.org/abs/2008.11469>, <DOI: 10.48550/arXiv.2008.11469>, pp. 1-pp. 20.

International Search Report for PCT Application No. PCT/JP2021/006119, mailed on May 18, 2021.

Xingyi Zhou et al., "Objects as Points", "https://arxiv.org/pdf/1904.07850.pdf", 2019.

George Papandreou et al., "PersonLab: Person Pose Estimation and Instance Segmentation with a Bottom-Up, Part-Based, Geometric Embedding Model", "https://arxiv.org/pdf/1803.08225.pdf", 2018.

\* cited by examiner

FIG. 3
Itag
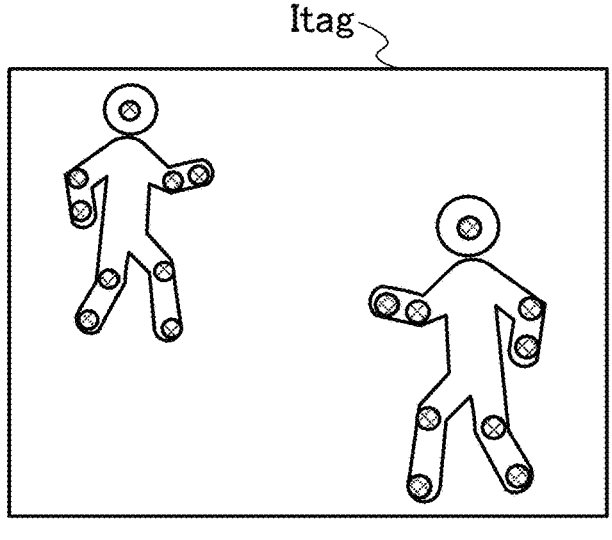
⊗:FEATURE POINT
Itag
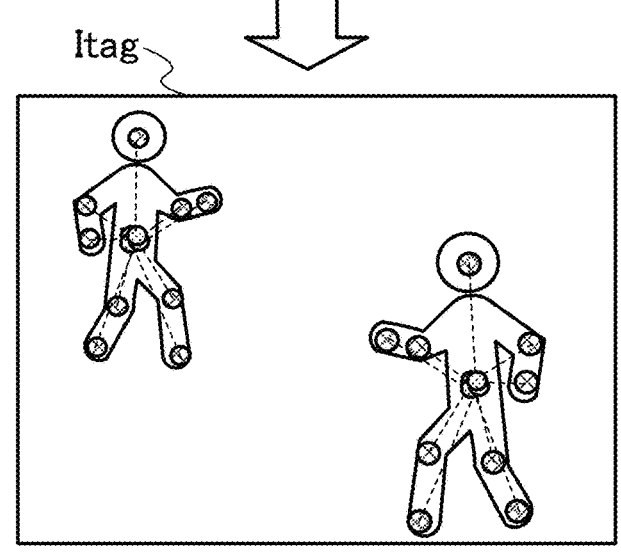
⊗:FEATURE POINT
⊙ :REPRESENTATIVE
  POINT CANDIDATE
Itag
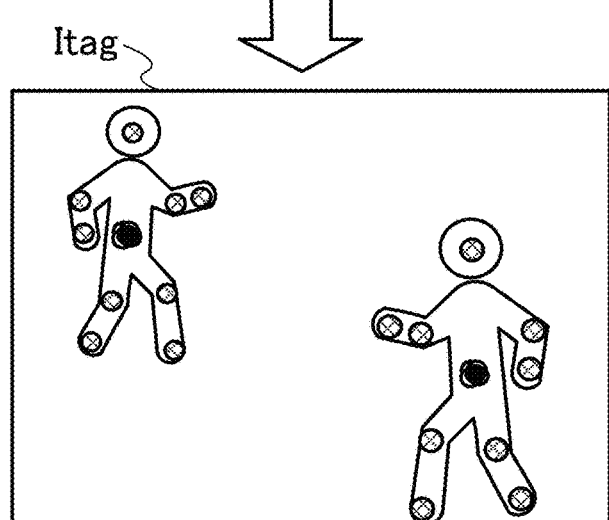
⊗:FEATURE POINT
○ :REPRESENTATIVE
  POINT CANDIDATE
●:ESTIMATED
  REPRESENTATIVE POINT

Figure 6:
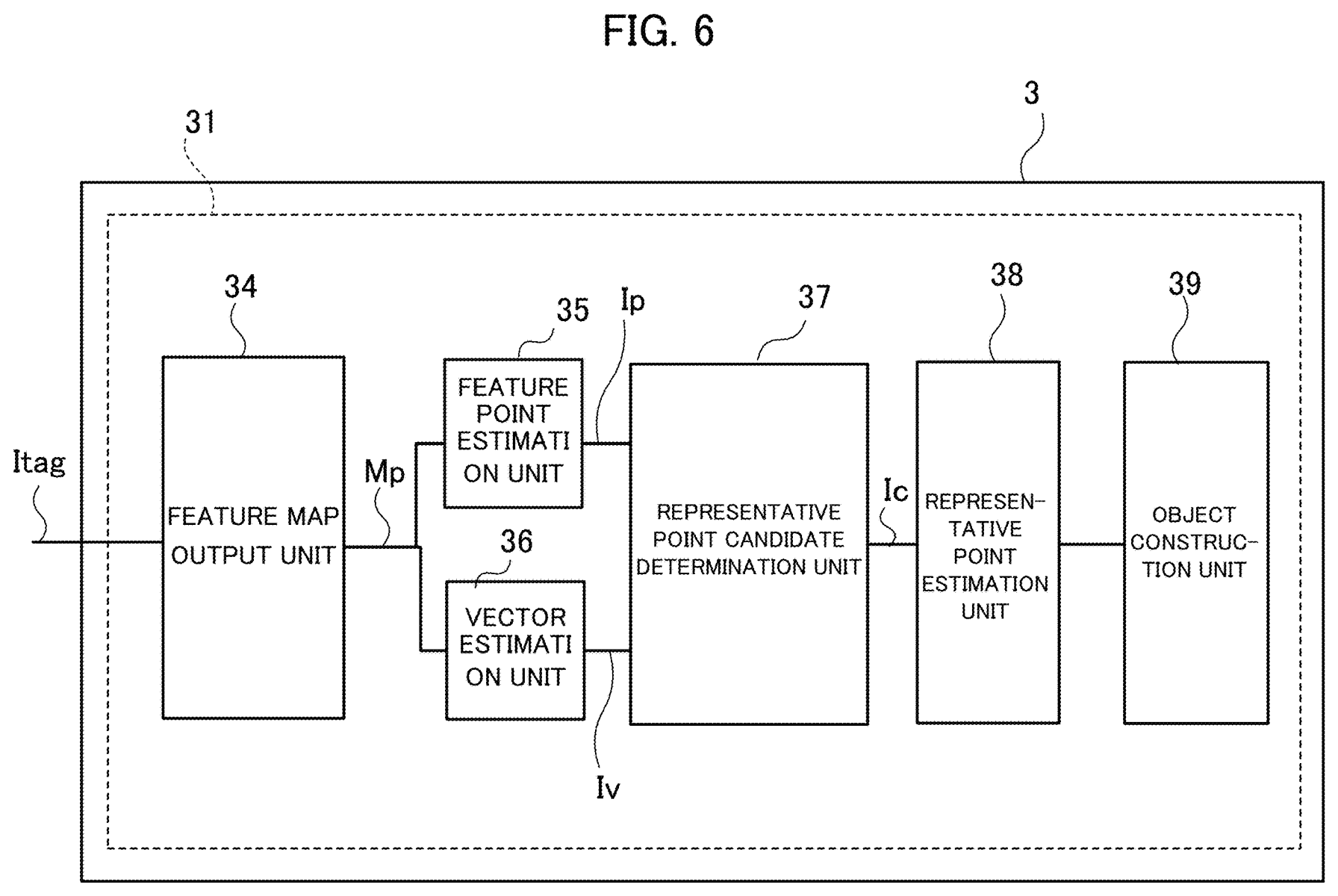

Itag

34 — FEATURE MAP OUTPUT UNIT

Mp

35 — FEATURE POINT ESTIMATION UNIT

36 — VECTOR ESTIMATION UNIT

Ip

Iv

37 — REPRESENTATIVE POINT CANDIDATE DETERMINATION UNIT

Ic

38 — REPRESENTATIVE POINT ESTIMATION UNIT

39 — OBJECT CONSTRUCTION UNIT

FIG. 9

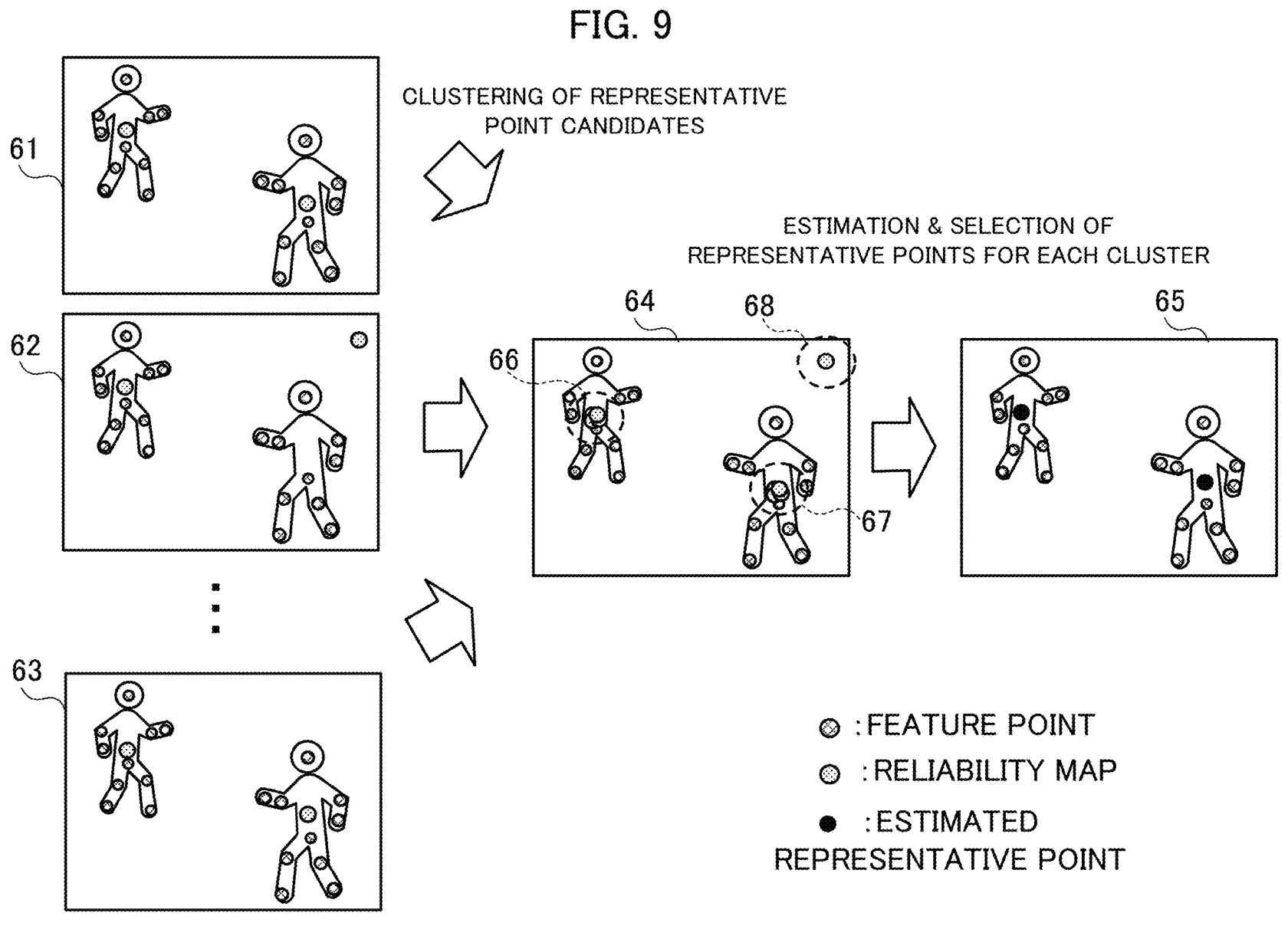

CLUSTERING OF REPRESENTATIVE POINT CANDIDATES

ESTIMATION & SELECTION OF REPRESENTATIVE POINTS FOR EACH CLUSTER

◎ : FEATURE POINT

◎ : RELIABILITY MAP

● : ESTIMATED REPRESENTATIVE POINT

FIG. 10

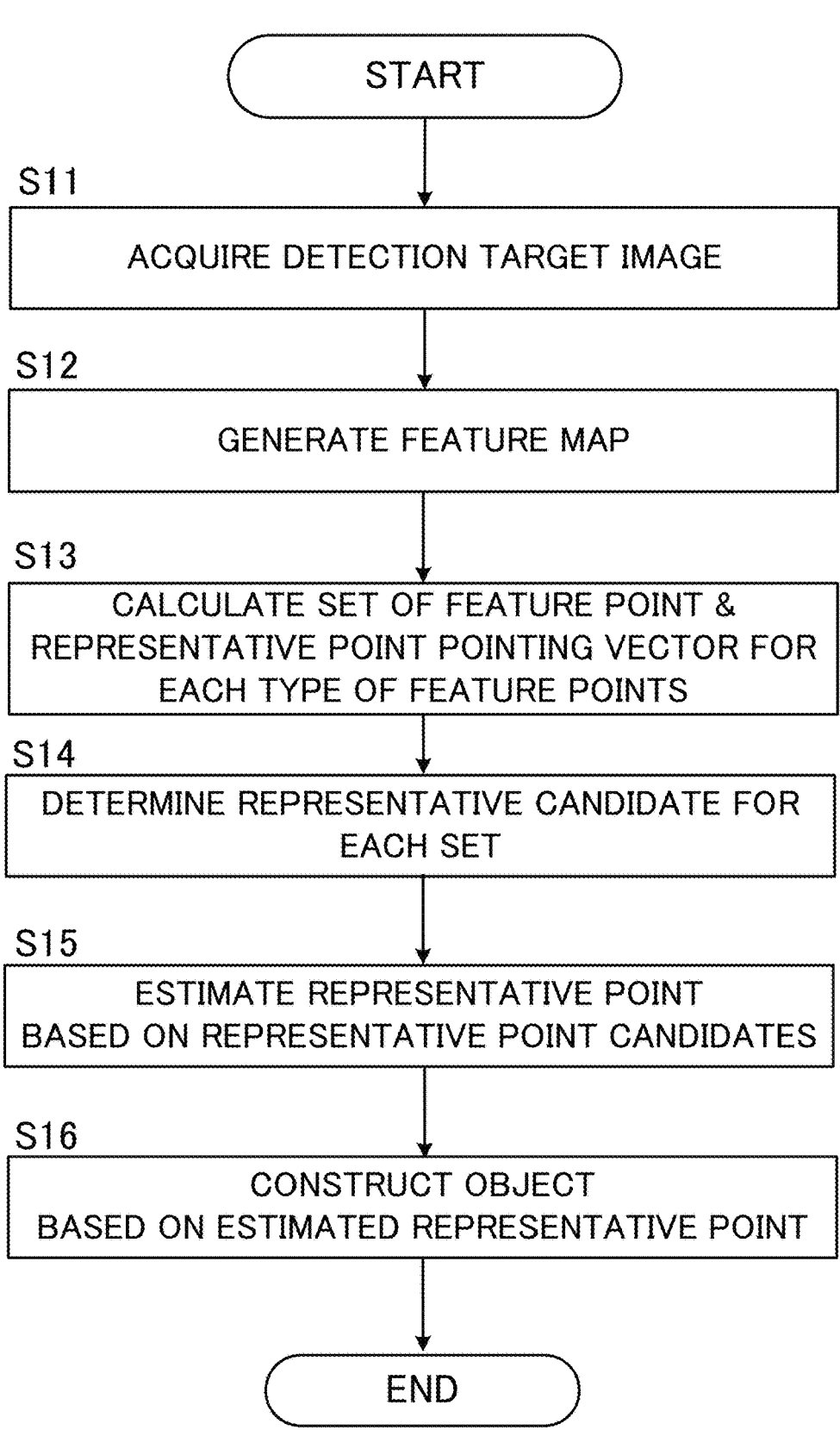

START

S11
ACQUIRE DETECTION TARGET IMAGE

S12
GENERATE FEATURE MAP

S13
CALCULATE SET OF FEATURE POINT &
REPRESENTATIVE POINT POINTING VECTOR FOR
EACH TYPE OF FEATURE POINTS

S14
DETERMINE REPRESENTATIVE CANDIDATE FOR
EACH SET

S15
ESTIMATE REPRESENTATIVE POINT
BASED ON REPRESENTATIVE POINT CANDIDATES

S16
CONSTRUCT OBJECT
BASED ON ESTIMATED REPRESENTATIVE POINT

END

⬡ : FEATURE POINT

⬡ : REGRESSION POINT

⊗ : FEATURE POINT

⊗ : FEATURE POINT

◎ : REPRESENTATIVE POINT CANDIDATE

⊕ : ESTIMATED BOX VERTEX

○ : ESTIMATED REPRESENTITIVE POINT

◎ : FEATURE POINT

◎ : FEATURE POINT
◉ : REPRESENTATIVE
    POINT CANDIDATE

⊕ : ESTIMATED
    BOUNDARY
    POINT

○ : ESTIMATED
    REPRESENTATIVE
    POINT

◁ : ESTIMATED
    OBJECT AREA

ESTIMATION DEVICE, ESTIMATION METHOD, AND STORAGE MEDIUM

This application is a National Stage Entry of PCT/JP2021/006119 filed on Feb. 18, 2021, the contents of all of which are incorporated herein by reference, in their entirety.

TECHNICAL FIELD

The present disclosure relates to the technical field of an estimation device, an estimation method, and storage medium.

BACKGROUND

There exists a technique to detect objects such as people and objects from an image. For example, Patent Literature 1 discloses a method of estimating the posture of each person to generate coordinate information of each person by detecting parts such as a head, a shoulder, an elbow, a hand, a waist, a knee, a foot, or the like thereof for each frame of a moving image. Further, Non-Patent Literature 1 discloses a technique for estimating the posture of an object by estimating a representative point of the object and estimating a vector from the estimated representative point to each joint point. Further, Non-Patent Literature 2 discloses a technique related to posture estimation and instance segmentation using Hough voting.

CITATION LIST

Patent Literature

Patent Literature 1: JP 2020-155089A

Non-Patent Literature

Non-Patent Literature 1: X. Zhou, et. al. "Objects as Points", "https://arxiv.org/pdf/1904.07850.pdf", 2019.
Non-Patent Literature 2: George Papandreou, Tyler Zhu, Liang-Chieh Chen, Spyros Gidaris, Jonathan Tompson, Kevin Murphy, "PersonLab: Person Pose Estimation and Instance Segmentation with a Bottom-Up, Part-Based, Geometric Embedding Model", "https://arxiv.org/pdf/1803.08225.pdf", 2018.

SUMMARY

Problem to be Solved

Under a congestion situation where objects and people frequently overlap with one another, a part of an object is shielded by other objects and therefore some of the joint points necessary for posture construction could be hidden, or the center position serving as a representative point of the object could be hidden. In such a case, there is an issue that the estimation accuracy in the above-described posture estimation method could deteriorate.

In view of the above-described issue, it is therefore an example object of the present disclosure to provide an estimation device, an estimation method, and a storage medium capable of suitably estimating the representative point of an object.

Means for Solving the Problem

In one mode of the estimation device, there is provided an estimation device including:

a feature point estimation means configured to estimate plural feature points relating to an object included in an image;
a representative point candidate determination means configured to determine plural representative point candidates that are candidates of a representative point of the object based on the plural feature points; and
is a representative point estimation means configured to estimate the representative point based on the plural representative point candidates.

In one mode of the estimation method, there is provided an estimation method executed by a computer, the estimation method including:
estimating plural feature points relating to an object included in an image;
determining plural representative point candidates that are candidates of a representative point of the object based on the plural feature points; and
estimating the representative point based on the plural representative point candidates.

In one mode of the storage medium, there is provided a storage medium storing a program executed by a computer, the program causing the computer to:
estimate plural feature points relating to an object included in an image;
determine plural representative point candidates that are candidates of a representative point of the object based on the plural feature points; and
estimate the representative point based on the plural representative point candidates.

Effect

An example advantage according to the present invention is to suitably estimate the representative point of an object.

BRIEF DESCRIPTION OF THE DRAWINGS

FIG. 3 is a diagram showing an outline of a representative point estimation process.
FIG. 6 illustrates a second example of the functional block of the estimation device.
FIG. 9 illustrates an outline of the integration method of representative point candidates based on cluster division.
FIG. 10 illustrates an example of a flowchart showing a processing procedure to be executed by the estimation device.

EXAMPLE EMBODIMENTS

Hereinafter, example embodiments of an estimation device, an estimation method, and a storage medium will be described with reference to the drawings.

First Example Embodiment (1) Overall Configuration

Figure 1:
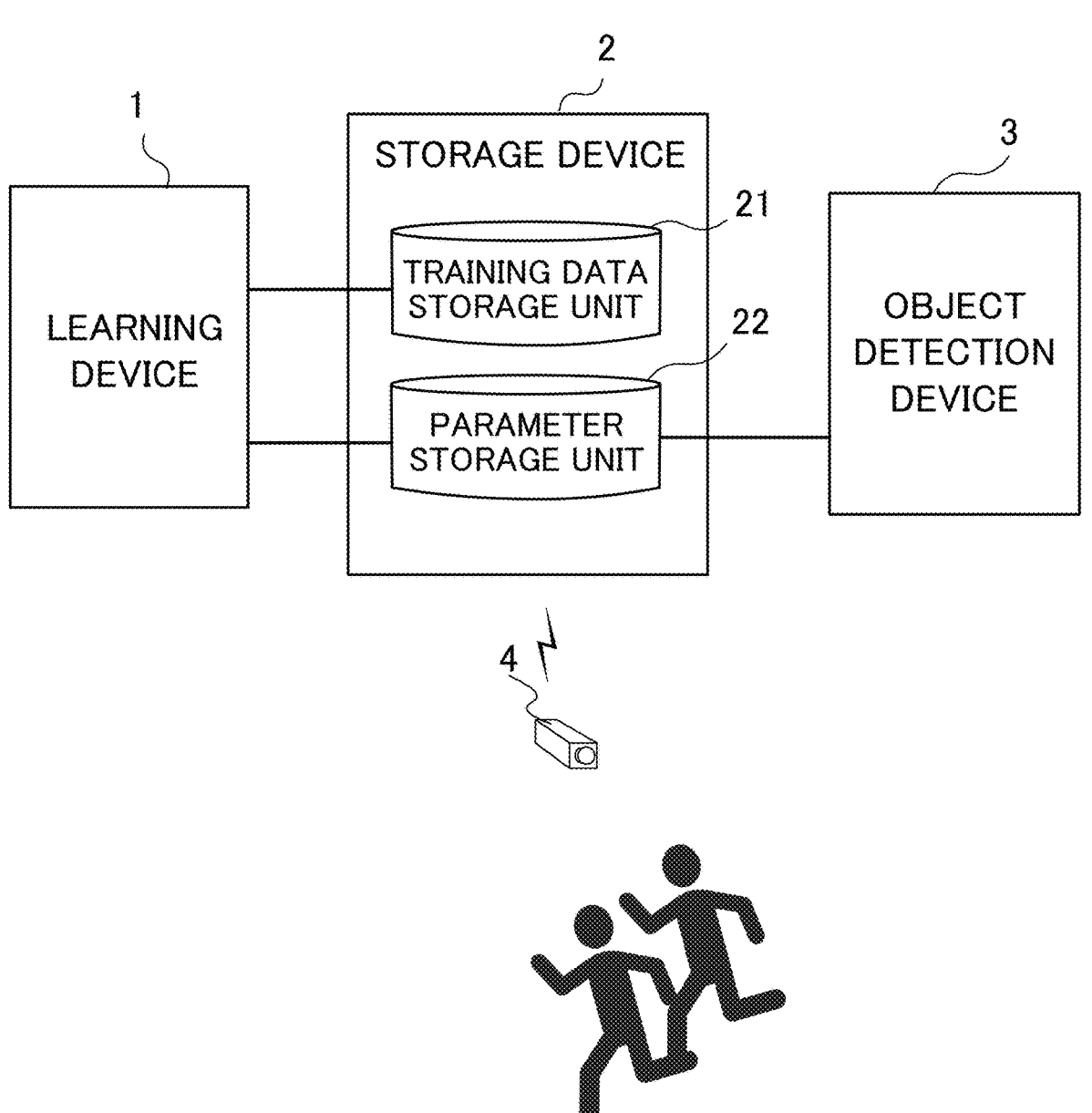
FIG. 1 illustrates a schematic configuration of an object detection system in an example embodiment.

FIG. 1 is a schematic configuration of an object detection system 100 in the first example embodiment. The object detection system 100 performs detection of an object, and estimates the representative point representing an object with high accuracy. The object detection system 100 mainly includes a learning device 1 that performs learning of a model to be used for detection of an object, a storage device 2 that stores information to be referred to by the learning device 1 and the object detection device 3, an object detection device 3 that performs processing related to detection of an object, and a camera 4 that photographs a target space of the object detection.

The learning device 1 performs learning (training) of a model (learning engine) relating to detection of an object on the basis of training data stored in the training data storage unit 21 of the storage device 2, and stores parameters of the model obtained by learning in the parameter storage unit 22.

The storage device 2 includes a training data storage unit 21 and a parameter storage unit 22. The training data storage unit 21 stores training data which is data to be used for learning (for training) by the learning device 1. The training data includes an input image and correct answer data regarding an object shown in the input image. Here, the correct answer data includes information on the feature points of each object included in the input image. Here, the "feature points" are positions of distinctive parts in a detection target and are determined in advance according to the type of a target object of detection. For example, when the detection target is a human, the feature points indicate the positions of the joints generally provided in a human. The correct answer data includes, for example, identification information indicating the type (class) of each feature point, identification information of the object to which the feature points belong, position information of each feature point, and vector information from each feature point to the representative point of the object.

The parameter storage unit 22 stores the parameters of the model trained by the learning device 1. The model may be a learning model based on a neural network, or may be any other type of a learning model such as a support vector machine, or may be a learning model that is a combination of them. For example, when a model based on a neural network such as a convolutional neural network is used, the parameter storage unit 22 stores information indicative of various parameters relating to the layer structure employed in the model, the neuron structure of each layer, the number of filters and the filter size in each layer, and the weight for each element of each filter.

The storage device 2 may be an external storage device such as a hard disk connected or built in to the learning device 1 or object detection device 3, or may be a storage medium such as a flash memory, or may be a server device which performs data communication with the learning device 1 and the object detection device 3. Further, the storage device 2 may be configured by a plurality of storage devices and holds each storage unit described above in a distributed manner.

The object detection device 3 detects an object included in the image captured by the camera 4. In this case, the object detection device 3 builds the model trained by the learning device 1 with reference to the parameters stored in the parameter storage unit 22 and performs processing relating to the estimation of the representative point based on the model. Hereinafter, an image (an image captured by the camera 4 in FIG. 1) to be used by the object detection device 3 for object detection is also referred to as "detection target image Itag".

The configuration of the object detection system 100 shown in FIG. 1 is an example, and various changes may be made. For example, at least two of the learning device 1, the storage device 2, and the object detection device 3 may be realized by a single device. In another example, the learning device 1 and the object detection device 3 may be configured by a plurality of devices, respectively. In this case, the plurality of devices constituting the learning device 1 and the plurality of devices constituting the object detection device 3 exchange information necessary for executing pre-assigned process among devices by wired or wireless direct communication or by communication through a network. The object detection system 100 may store images each serving as a detection target image Itag in advance in the storage device 2, instead of being equipped with the camera 4, (2) Hardware Configuration Next, the hardware configurations of the learning device 1 and the object detection device 3 will be described.

Figure 2A:
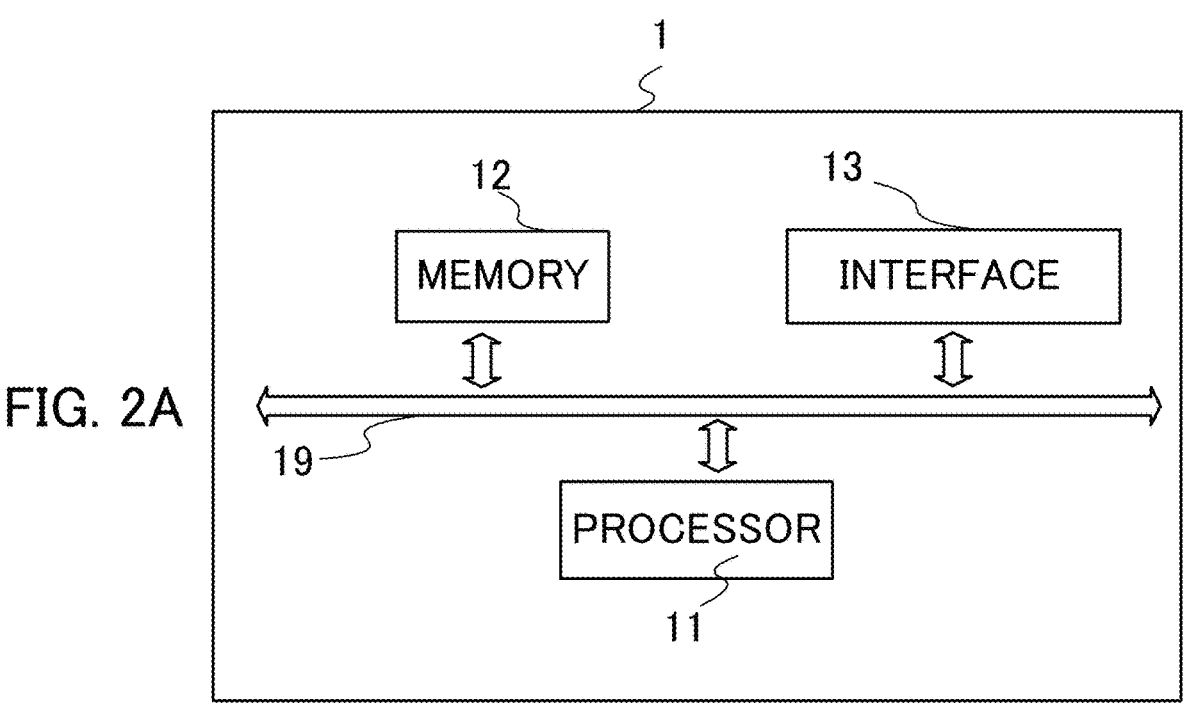
FIG. 2A illustrates an example of the hardware configuration of a learning device.

FIG. 2A shows an example of a hardware configuration of the learning device 1. The learning device 1 includes a processor 11, a memory 12, and an interface 13 as hardware. The processor 11, the memory 12, and the interface 13 are connected to one another via a data bus 19.

The processor 11 functions as a controller (computing unit) for controlling the entire learning device 1 by executing a program stored in the memory 12. Examples of the processor 11 include a CPU (Central Processing Unit), a GPU (Graphics Processing Unit), a TPU (Tensor Processing Unit), and a quantum processor. The processor 11 may be configured by a plurality of processors. The processor 11 is an example of a computer.

The memory 12 is configured by a variety of volatile and non-volatile memories, such as a RAM (Random Access Memory), a ROM (Read Only Memory), and a flash memory. Further, a program for the learning device 1 to execute a process is stored in the memory 12. A part of the information stored in the memory 12 may be stored by an external storage device such as a storage device 2 that can communicate with the learning device 1, or may be stored by a storage medium detachable from the learning device 1. The memory 12 may also store information stored by the storage device 2 instead.

The interface 13 is one or more interfaces for electrically connecting the learning device 1 to other devices. Examples of the interfaces include a wireless interface, such as network adapters, for transmitting and receiving data to and from other devices wirelessly and a hardware interface, such as a cable, for connecting to other devices.

Figure 2B:
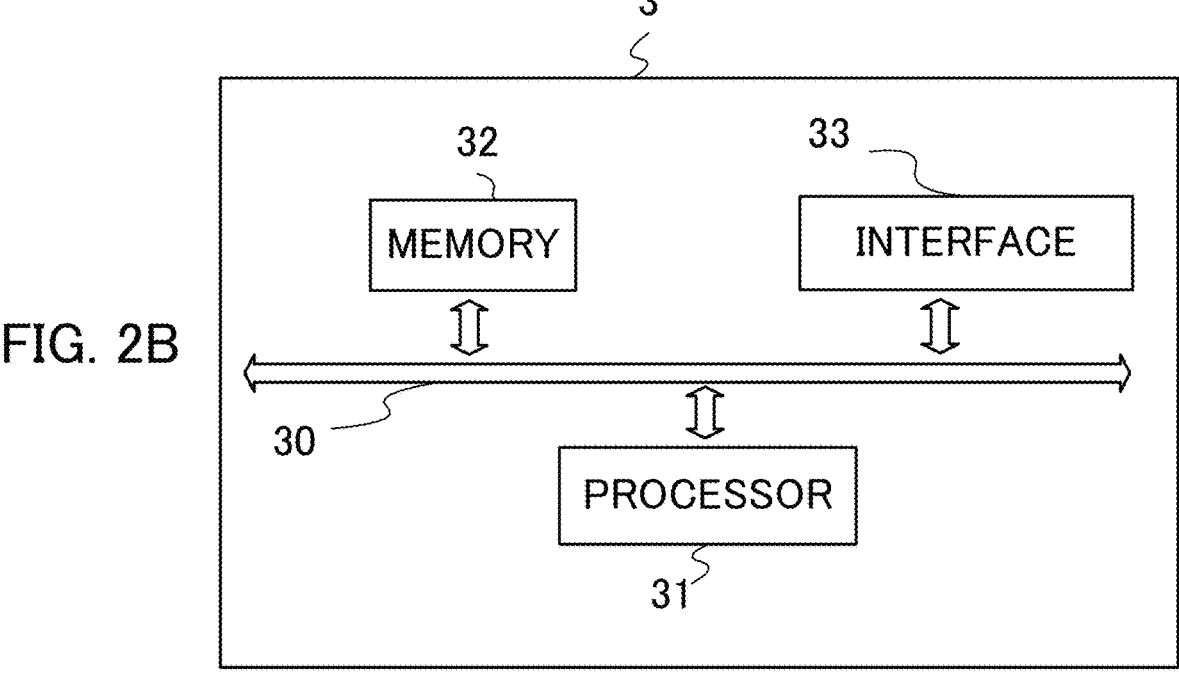
FIG. 2B illustrates an example of the hardware configuration of an estimation device.

FIG. 2B shows an example of a hardware configuration of the object detection device 3. The object detection device 3 includes, as hardware, a processor 31, a memory 32, and an interface 33. The processor 31, the memory 32, and the interface 33 are connected to one another via a data bus 30.

The processor 31 functions as a controller (arithmetic unit) for controlling the entire object detection device 3 by executing a program stored in the memory 32. Examples of the processor 31 include a CPU, a GPU, a TPU, and a quantum processor. The processor 31 may be configured by a plurality of processors. The processor 31 is an example of a computer.

The memory 32 is configured by a variety of volatile and non-volatile memories, such as a RAM, a ROM, and a flash memory. Further, the memory 32 stores a program for the object detection device 3 to execute a process. A part of the information stored in the memory 32 may be stored in an external storage device, such as the storage device 2, that can communicate with the object detection device 3, or may be stored by a storage medium detachable from the object detection device 3. The memory 32 may alternatively store the information stored by the storage device 2.

The interface 33 is one or more interfaces for electrically connecting the object detection device 3 to other devices. Examples of the interfaces include a wireless interface, such as a network adapter, for transmitting and receiving data to and from other devices wirelessly and a hardware interface, such as a cable, for connecting to other devices.

The hardware configurations of the learning device 1 and the object detection device 3 are not limited to the configurations shown in FIGS. 2A and 2B. For example, at least one of the learning device 1 or the object detection device 3 may further include a display unit such as a display, an input unit such as a keyboard and a mouse, and/or a sound output unit such as a speaker.

(3) Outline of Representative Point Estimation Process

Next, an outline of a representative point estimation process that is a process relating to representative point estimation of an object by the object detection device 3 will be described. FIG. 3 is a diagram illustrating an outline of a representative point estimation process that is executed by the object detection device 3 based on an image. In FIG. 3, the processing results obtained in the process of the representative point estimation are clearly shown on the detection target image Itag.

First, the object detection device 3 performs a process of detecting the feature points of the object from the detection target image Itag (see the image on the upper side). In this instance, the object detection device 3 detects multiple types of feature points that are predetermined for an object in the detection target image Itag. Accordingly, the object detection device 3 detects multiple feature points for one object. Next, the object detection device 3 estimates, from each of the detected multiple feature points, a position that is a candidate of the representative point of the object to which the each of the detected multiple feature points belong. Hereafter, a candidate position, which is estimated from each individual feature point, of the representative point of the object is simply referred to as "representative point candidate". The number of generated representative point candidates is the same as the number of detected feature points.

Next, for each object, the object detection device 3 estimates the position of the representative point of the each object from multiple representative point candidates. In this case, for each object, the object detection device 3 estimates the most-likely position of the representative point of the each object by voting based on representative point candidates the number of which is equal to the number of feature points. The representative point estimated by the object detection device 3 is also referred to as "estimated representative point". In this way, the object detection device 3 estimates the representative point from each of the detected feature points, and integrates the multiple estimation results into the finally estimated position of the representative point. Thereby, even when some feature points are hidden, it is possible to estimate the representative point of the object with high accuracy based on the detected feature points. Further, the learning device 1 can estimate the posture of the object or the like with high accuracy on the basis of the estimated representative point with high estimation accuracy. A technique for estimating a feature point such as a joint point of an object and the posture of the object from the representative point of the object is disclosed in, for example, Non-Patent Literature 1.

(4) Processing by Learning Device

Figure 4:
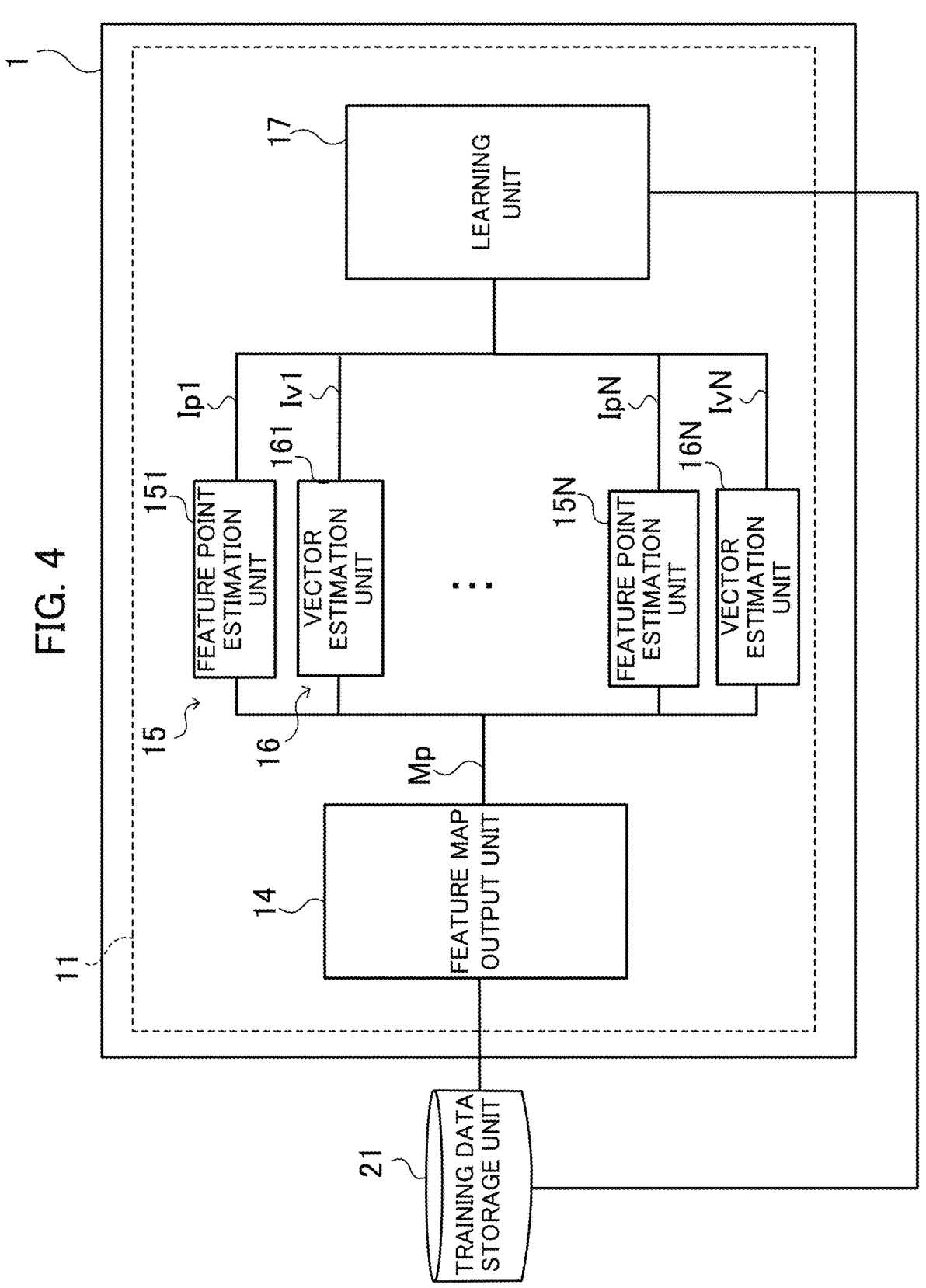
FIG. 4 illustrates an example of functional blocks of the learning device.

Next, an example of a learning method of a model by the learning device 1 necessary for the representative point estimation process described in FIG. 3 will be described. FIG. 4 is an example of functional blocks of the learning device 1. As shown in FIG. 4, the processor 11 of the learning device 1 functionally includes a feature map output unit 14, multiple sets (the first set to the Nth set in this case) of a feature point estimation unit 15 (151 to 15N) and a vector estimation unit 16 (161 to 16N), and a learning unit 17. "N" is the number of feature points (the number of feature types) of a target object of detection, and is set to an integer equal to or larger than two. In FIG. 4, any blocks to exchange data with each other are connected by a solid line, but the combination of blocks to exchange data with each other is not limited to FIG. 4. The same applies to the drawings of other functional blocks described below.

The feature map output unit 14 generates a feature map "Mp" from the input image extracted from the training data storage unit 21. The feature map Mp is data obtained by converting the image into a format suitable for inputting into each feature point estimation unit 15 and each vector estimation unit 16, which will be described later, and is a map representing the features (feature quantity) in the image. In this case, for example, the feature map output unit 14 is, a learning model (also referred to as "feature map output model") configured to output the feature map Mp when an image is inputted thereto. The parameters of the feature map output model are determined by the learning unit 17 and stored in the parameter storage unit 22. The feature map output unit 14 may be, instead of being a single unit, for example, N units in total each of which is provided for each set of the feature point estimation unit 15 and the vector estimation unit 16. In another example, a total of two feature map output units 14 may be provided separately for the feature point estimation unit 15 and for the vector estimation unit 16, and a total of 2N feature map output units 14 may be individually provided for the feature point estimation units 151 to 15N and the vector estimation unit 161 to 16N, respectively. The feature map output unit 14 may also generate one feature map Mp from a plurality of inputted images generated in a time series.

The feature point estimation unit 15 (151 to 15N) estimates each feature point (i.e., the position of each feature point) of the target object of detection, based on the feature point map Mp. In the example shown in FIG. 4, the feature point estimation units 151 to 15N estimate feature points corresponding to assigned types, and outputs the feature point information "Ip1" to "IpN" indicating the estimated feature points, respectively. In this case, each of the feature point estimation units 15 is, for example, a learning model (also referred to as "feature point estimation model") configured to output the estimation result regarding the target feature point when the feature point map Mp is inputted thereto. Examples of the feature point estimation model include a regression type model configured to output the coordinate value of the target feature point, and a model configured to output a heat map (reliability map), on the image, showing the reliability regarding the target feature point with respect to each coordinate value. The "coordinate value" may be a value indicating a position in the image in pixel units or may be a value indicating a position in the image in sub-pixel units. In this case, the parameters of the feature point estimation model corresponding to each feature point estimation unit 15 is determined by the learning unit 17 and stored in the parameter storage unit 22.

The vector estimation unit 16 (161 to 16N) estimates, based on the feature map Mp, a vector (also referred to as "representative point pointing vector") from the feature point of the target object of detection to the representative point. For example, the representative point pointing vector indicates the relative position of the representative point candidate (x-coordinate value and y-coordinate value) relative to the position of the target feature point. In the example shown in FIG. 4, the vector estimation units 161 to 16N output the vector information "Iv1" to "IvN" representing the representative point pointing vectors based on the feature points corresponding to the assigned types, respectively. In this case, each vector estimation unit 16 is a learning model (also referred to as "vector estimation model") configured to output information regarding a representative point pointing vector that is a vector from the feature point of interest to the representative point candidate when the feature map Mp is inputted thereto. The information outputted by the vector estimation model is, for example, a vector map, the details of which will be described later. The parameters of the vector estimation model corresponding to each vector estimation unit 16 is determined by the learning unit 17 and stored in the parameter storage unit 22.

It is noted that the vector estimation units 161 to 16N may estimate the representative point pointing vectors based on the estimation results of the feature points outputted by the corresponding feature point estimation units 151 to 15N, respectively. In this case, the vector estimation model is a learning model configured to output information regarding the representative point pointing vector when the feature map Mp and the estimation result from the corresponding feature point estimation unit 15 are inputted thereto.

It is also noted that the vector estimation model corresponding to the vector estimation unit 16 may be a learning model that is trained to output vector information regarding all types of feature points when the feature map Mp is inputted thereto. In this instance, instead of the vector estimation unit 161 to the vector estimation unit 16N shown in FIG. 4, a single vector estimation unit 16 is provided. Similarly, the feature point estimation model corresponding to the feature point estimation unit 15 may be a learning model that is trained to output feature point information regarding all types of feature points when the feature points map Mp is inputted thereto. In this instance, instead of the feature point estimation unit 151 to the feature point estimation unit 15N shown in FIG. 4, a single feature point estimation unit 15 is provided.

The learning unit 17 updates the parameters of the feature map output model, the feature point estimation models, and the vector estimation models based on the feature point information Ip1 to IpN and the vector information Iv1 to IvN and the correct answer data stored in the training data storage unit 21. In this case, the learning unit 17 determines the above-described parameters so as to minimize the error (loss) between the position of each feature point indicated by the feature point information Ip1 to IpN and the position of each feature point indicated by the correct answer data and the error (loss) between each representative point pointing vector indicated by the vector information Iv1 to IvN and the vector from each feature point to the representative point indicated by the correct answer data. Such a parameter determination algorithm may be any learning algorithm used in machine learning, such as gradient descent method and error back propagation method. Then, the learning unit 17 ends the learning when predetermined termination conditions of the learning are satisfied. For example, when the trainings for a predetermined number of sets of the input image and the correct answer data are completed, when a user input or the like indicating that the learning should be terminated is detected, or/and when the error becomes equal to or less than a predetermined threshold value, the learning unit 17 determines that the termination conditions of the learning is satisfied.

(5) Processing by Object Detection Device

Next, the process to be executed by the object detection device 3 after learning process by the learning device 1 will be described.

(5-1) Functional Blocks

Figure 5:
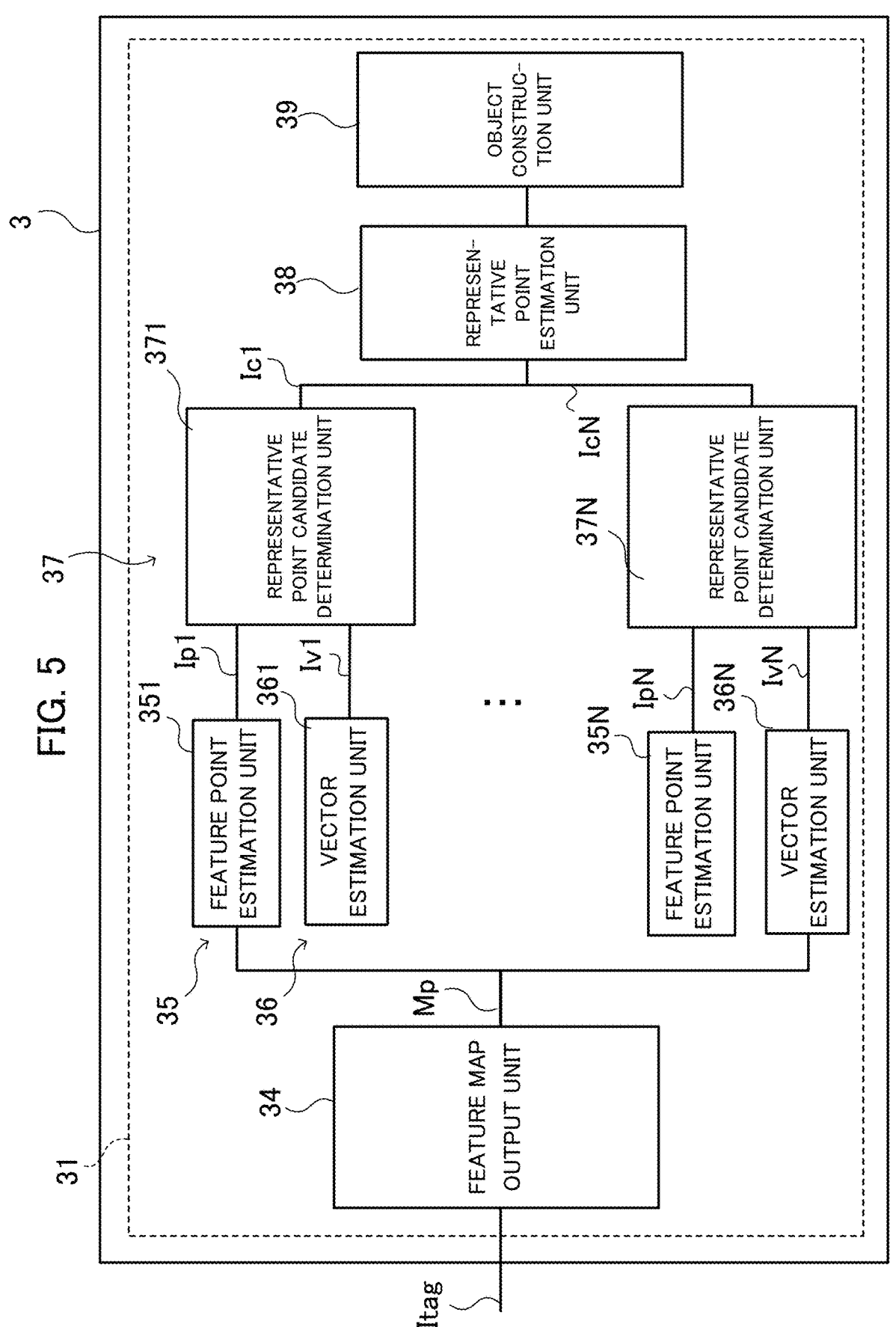
FIG. 5 illustrates a first example of functional blocks of the estimation device.

FIG. 5 is an example of functional blocks of the object detection device 3. As shown in FIG. 5, the processor 31 of the object detection device 3 functionally includes a feature map output unit 34, multiple sets (here, the first set to the Nth set) of a feature point estimation unit 35 (351 to 35N), a vector estimation unit 36 (361 to 36N), and a representative point candidate determination unit 37 (371 to 37N), a representative point estimation unit 38, and an object construction unit 39.

When the feature map output unit 34 acquires a detection target image Itag, the feature map output unit 34 generates the feature map Mp from the detection target image Itag. In this instance, the feature map output unit 34 builds the feature map output model trained by the learning device 1 with reference to the parameter storage unit 22 and acquires the feature map Mp by inputting the detection target image Itag into the feature map output model. The feature map output unit 34 may generate the feature map Mp from a plurality of detection target images Itag generated in time series.

The feature point estimation unit 35 determines estimated positions of the feature points of the target object of detection based on the feature point map Mp. In the example shown in FIG. 5, the feature point estimation units 351 to 35N estimate the feature points for individually assigned types and outputs the feature point information Ip1 to IpN indicating the estimated feature points, respectively. In this instance, the feature point estimation unit 35 builds each feature point estimation model trained by the learning device 1 with reference to the parameter storage unit 22 and acquires the feature point information Ip1 to IpN by inputting the feature point map Mp into each feature point estimation model. Here, the feature point estimation units 351 to 35N correspond to the feature point estimation units 151 to 15N (see FIG. 4) after completion of the learning, respectively.

The vector estimation unit 36 estimates, based on the feature map Mp, the representative point pointing vectors from the feature points of the target object of detection to the representative point candidates, respectively. In the example shown in FIG. 5, the vector estimation units 361 to 36N output vector information Iv1 to IvN indicating the representative point pointing vectors corresponding to the assigned types of feature points, respectively. In this instance, the vector estimation unit 36 builds each vector estimation model trained by the learning device 1 with reference to the parameter storage unit 22 and acquires the vector information Iv1 to IvN by inputting the feature map Mp into each vector estimation model. Here, the vector estimation units 361 to 36N correspond to the vector estimation units 161 to 16N (see FIG. 4) after completion of the learning, respectively.

The representative point candidate determination unit 37 determines a plurality of representative point candidates based on a plurality of feature points. In the example shown in FIG. 5, the representative point candidate determination units 371 to 37N generate the representative point candidate information "Ic1" to "IcN" indicating the representative point candidates for respective types of the feature points, on the basis of an information set (Ip1, Iv1) to an information set (IpN, IvN) that are outputted per type of the feature points by the feature point estimation units 351 to 35N and the vector estimation units 361 to 36N. In this case, for each feature point, the representative point candidate determination unit 37 determines the representative point candidates from the estimated positions of the feature points indicated by the feature point information and the representative point pointing vectors indicated by the corresponding vector information. In this way, with respect to each feature point detected by the feature point estimation unit 35, the representative point candidate determination unit 37 determines the representative point candidate that a candidate of the representative point of the object to which the each feature point belong.

The representative point estimation unit 38 estimates the representative point for each object based on the representative point candidate information Ic1 to IcN supplied from the representative point candidate determination unit 37. The processing by the representative point estimation unit 38 will be described later. The object construction unit 39 makes, for each estimated representative point determined by the representative point estimation unit 38, a determination (that is, the determination of the object to which each feature point belongs) of the belonging object of each feature point detected by the feature point estimation unit 35 and generates object information representing the position and the posture of the object on the basis of the belonging determination result.

It is noted that the feature point estimation unit 35 may output the feature point information indicating the positions of all feature points when the feature points map Mp is inputted thereto. Similarly, the vector estimation unit 36 may output the vector information indicating the representative point pointing vectors corresponding to all feature points when the feature map Mp is inputted thereto.

FIG. 6 shows a functional block diagram when the feature point estimation units 351 to 35N are integrated into one feature point estimation unit 35 and the vector estimation units 361 to 36N are integrated into one vector estimation unit 36. In this case, the feature point estimation unit 35 outputs the feature point information Ip indicating the positions of all (i.e., N types) feature points when the feature points map Mp is inputted thereto, and the vector estimation unit 36 outputs the vector information Iv indicating the feature point pointing vectors regarding all (i.e., N types) feature points when the feature points map Mp is inputted thereto. The representative point candidate determination unit 37 supplies the representative point estimation unit 38 with the representative point candidate information Ic indicating the representative point candidates derived from respective feature points based on the feature point information Ip and the vector information Iv. The representative point candidate information Ic corresponds to information obtained by combining the representative point candidate information Ic1 to representative point candidate information IcN in FIG. 5.

Each component (the feature map output unit 34, the feature point estimation unit 35, the vector estimation unit 36, the representative point candidate determination unit 37, the representative point estimation unit 38, and the object construction unit 39) of the processor 31 illustrated in FIG. 5 and FIG. 6 described above can be realized by the processor 31 executing a program. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. Further, at least a part of the components may be configured by a ASSP (Application Specific Standard Produce) or ASIC (Application Specific Integrated Circuit). In this way, each component may be implemented by a variety of hardware. The above is true for other example embodiments to be described later. Further, each of these components may be realized by the collaboration of a plurality of computers, for example, using cloud computing technology. The above is also true for other example embodiments to be described later.

Further, the functional blocks shown in FIGS. 5 and 6 are an example, and any modification may be applied thereto. For example, the vector estimation unit 36 may be incorporated in the representative point candidate determination unit 37. In this case, the representative point candidate determination unit 37 performs a process of generating the representative point candidate information Ic from the feature point information Ip and the feature map Mp on the basis of a model configured to output the representative point candidates when the feature point information Ip and the feature map Mp are inputted thereto.

(5-2) Vector Information

Next, a supplementary description will be given of the vector information Iv to be generated by the vector estimation unit 16. The vector information Iv may be a vector map indicative of a representative point pointing vector for each type of the feature points, or may be a vector map indicative of a representative point pointing vectors for all (i.e., N types) feature points.

Figure 7A:
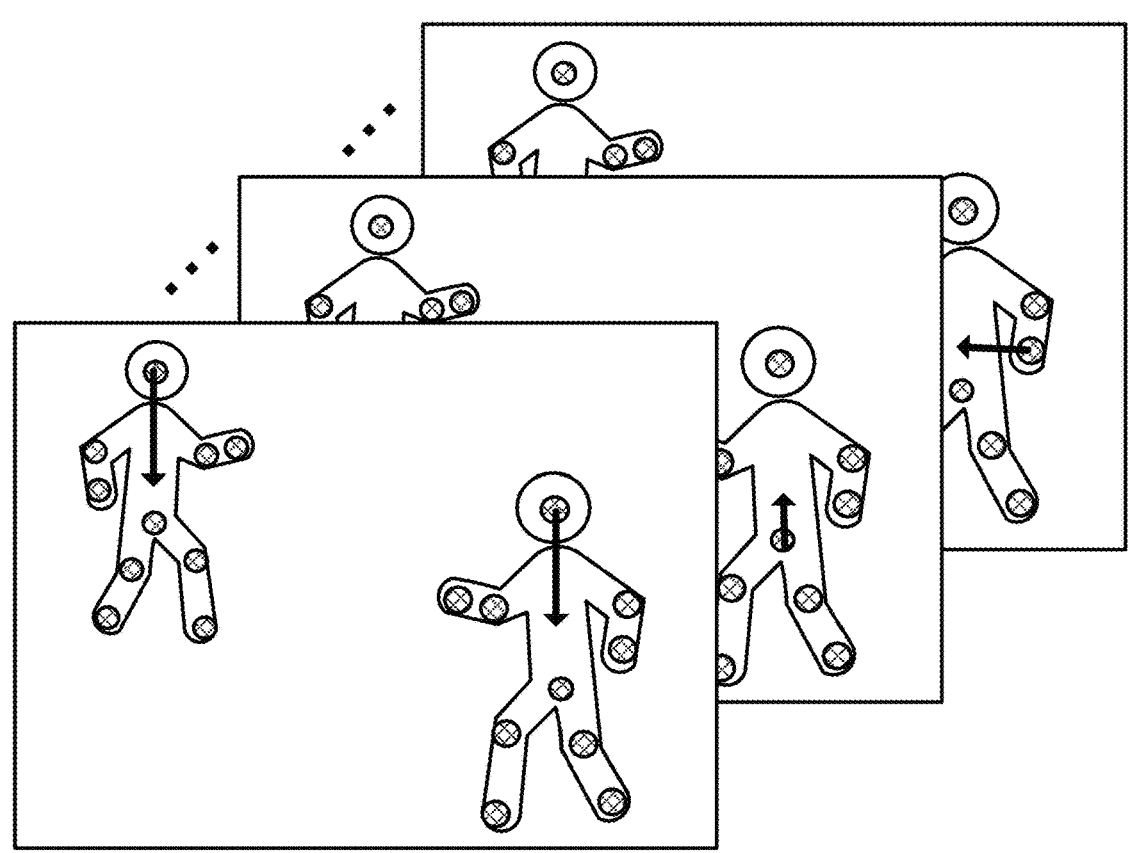
FIG. 7A illustrates a vector map outputted in the functional blocks shown in FIG. 5.
Figure 7B:
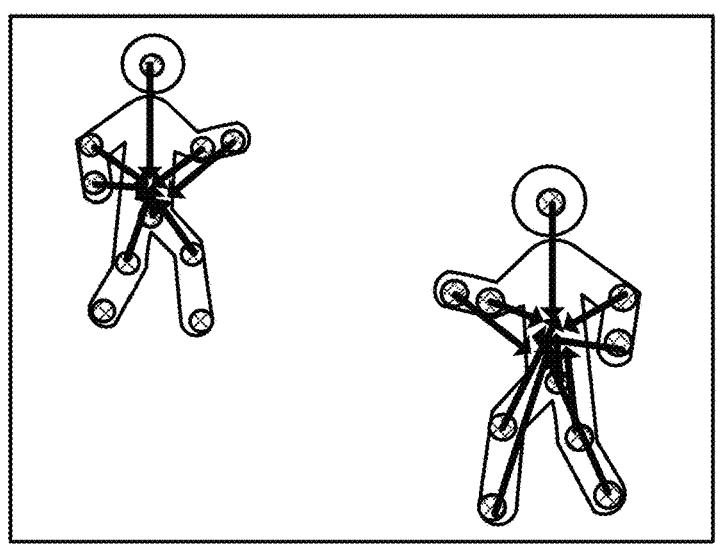
FIG. 7B illustrates a vector map outputted in the functional blocks shown in FIG. 6.

FIG. 7A shows an outline of a vector map having multiple channels outputted by the vector estimation units 361 to 36N in the functional blocks shown in FIG. 5, and FIG. 7B shows an outline of a vector map outputted by the vector estimation unit 36 in the functional blocks shown in FIG. 6. In FIG. 7A and FIG. 7, the representative point pointing vectors corresponding to respective channels of the vector map are indicated as arrows on the detection target image Itag in which the feature points of the object are clearly indicated.

In the example (see FIG. 5) in which the vector estimation units 361 to 36N for calculating the representative point pointing vector for each type of the feature points are provided, the vector estimation units 361 to 36N generates a vector map having channels each indicating the representative point pointing vector for each type of the feature points, as shown in FIG. 7A. In this instance, actually, for each type of the feature points, there are provided a channel representing the x-coordinate value of the representative point pointing vector and a channel representing the y-coordinate value thereof. Thus, in this case, the vector estimation units 361 to 36N generate a vector map having 2N (2×N) channels in total.

On the other hand, in an example (see FIG. 6) in which one vector estimation unit 36 for calculating the representative point pointing vectors corresponding to all types of feature points is provided, the vector estimation unit 36 generates a vector map showing the representative point pointing vectors corresponding to all types of feature points, as shown in FIG. 7B. In this case, actually, there are provided a channel representing the x-coordinate value of the representative point pointing vectors of all the feature points and a channel representing the y-coordinate value thereof. Thus, in this case, the vector estimation unit 36 generates a vector map having two channels in total.

Then, the vector estimation unit 36 (361 to 36N) supplies vector information Iv (Iv1 to IvN) corresponding to the above-described vector map to the representative point candidate determination unit 37 (371 to 37N). Thereby, the representative point candidate determination unit 37 (371 to 37N) can suitably identify the representative point candidate to be the end point of the representative point pointing vector whose start point is set to each feature point estimated by the feature point estimation unit 35.

(5-3) Estimation of Representative Point

Next, a method of estimating the representative point by the representative point estimation unit 38 will be described. The representative point estimation unit 38 determines the estimated representative point into which the representative point candidates for each feature point indicated by the representative point candidate information Ic (Ic1 to IcN) are integrated by voting. Here, as an example, a method of integrating representative point candidates based on the reliability map and a method of integrating representative point candidates based on the cluster division will be specifically described, respectively.

Figure 8:
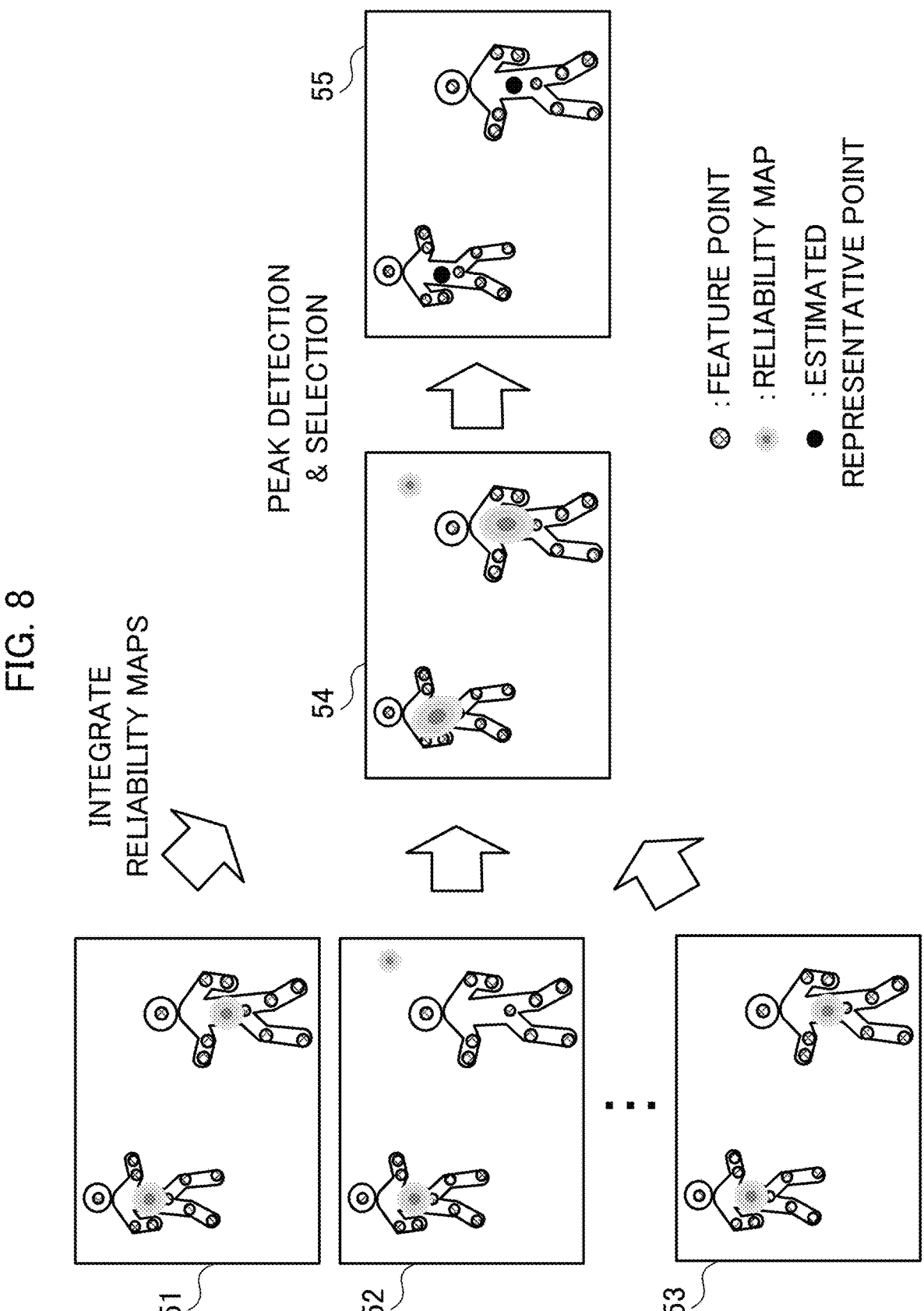
FIG. 8 illustrates an outline of the integration process of representative point candidates based on the reliability map.

FIG. 8 shows an outline of the integration process of representative point candidates based on the reliability map.

In FIG. 8, images 51 to 53 are images each obtained by superimposing a confidence map showing a normal distribution (Gaussian distribution) of confidence having a peak at the coordinate position of each representative point candidate defined for each type of the feature points on the detection target image Itag with clear indication of the estimated position of each feature point. In addition, the image 54 is an image obtained by superimposing a map (also referred to as "cumulative map") into which the reliability maps for respective types of the feature points are integrated (summed up) on the detection target image Itag with clear indication of the estimated position of each feature point. The image 55 is an image obtained by superimposing the estimated representative points determined based on the cumulative map on the detection target image Itag with clear indication of the estimated position of each feature point.

In this case, since there are two objects (pedestrians in this case) to be detected in the detection target image Itag, the representative point candidate determination unit 37 determines two the representative point candidates for each type of the feature points, and the representative point estimation unit 38 generates a reliability map including two normal distributions having the peaks of reliability at the coordinate positions of the two representative point candidates. Here, in the image 52, one representative point candidate exists outside the object due to the estimation error of the corresponding feature point or the representative point pointing vector, and a high-reliability area centered on the position of the one representative point candidate is provided.

The maximum value of the normal distribution to be set for each representative point candidate may be set on the basis of, for example, a score (also referred to as "feature point score") indicating the certainty of estimation of the corresponding feature point. For example, when the feature point estimation unit 15 outputs the reliability maps of the feature points for respective types of the feature points, the feature point estimation unit 38 determines the above-described feature point score of a feature point to be the reliability corresponding to the position of the feature point in the reliability map and sets a maximum value corresponding to the feature point score at the coordinate position of the corresponding representative point candidate. In another example, when the feature point estimation unit 15 outputs the coordinate position of a feature point for each type of the feature points, the feature point estimation unit 38 determines the feature point score to be the confidence score outputted together with the coordinate position and sets the maximum value corresponding to the feature point score at the coordinate position of the corresponding representative point candidate.

Then, the representative point estimation unit 38 generates the integrated cumulative map by summing up the reliability maps with respect to each corresponding pixel (or sub-pixel), wherein the reliability maps are made based on representative point candidates for respective types of feature points (see the image 54). Here, in the cumulative map, the peaks of reliability are formed on the two objects included in the detection target image Itag, and the peak of reliability corresponding to the representative point candidate outside the objects in the image 52 are formed.

Then, the representative point estimation unit 38 determines the estimated representative points to be the positions of the peaks satisfying a predetermined condition among these peaks. In the first example, the representative point estimation unit 38 determines that a peak at which the reliability in the cumulative map is equal to or larger than a predetermined value is an estimated representative point. On the other hand, the representative point estimation unit 38 determines that any peak at which the reliability in the cumulative map is less than the predetermined value is a peak generated by error, and does not use it as the estimated representative point. The predetermined value described above, for example, is stored in the storage device 2 or the memory 12 in advance. In the second example, for each peak, the representative point estimation unit 38 counts the number of feature point types corresponding to the representative point candidates whose reliability at the position of the each peak is equal to or larger than a predetermined threshold value. Then, the representative point estimation unit 38 determines that such a peak for which the counted number of the feature point types is equal to or larger than a predetermined number is an estimated representative point. On the other hand, the representative point estimation unit 38 determines that such a peak for which the counted number of the feature point types is less than the predetermined number is a peak generated by error and does not use it as the estimated representative point. The above-mentioned threshold value and predetermined number, for example, are stored in the memory device 2 or memory 12 in advance.

Then, in the example shown in FIG. 8, there are three peaks in the cumulative map shown in the image 54, and the representative point estimation unit 38 selects, as the estimated representative points, the positions of two peaks from these three peaks according to the first example or the second example described above. In this case, the representative point estimation unit 38 recognizes that there are two target objects of detection based on the number of estimated representative points. Thus, according to the integration process of the representative point candidates based on the reliability map, the representative point estimation unit 38 can suitably calculate the number of target objects of detection and the estimated positions of the representative points thereof, based on the representative point candidates for each feature point.

The method of generating the map for determining the estimated representative point is not limited to the above-described example. For example, the representative point estimation unit 38 may determine the map for determining the estimated representative point by Hough voting based on the position of each representative point candidate. The detail of Hough voting is disclosed in Non-Patent Literature 2. Even in this example, the representative point estimation unit 38 can suitably determine the estimated position of the representative point of a target object of detection based on the representative point candidates for each of the feature points.

Next, a description will be given of a method of integrating representative point candidates based on cluster division. FIG. 9 shows an overview of a method of integrating representative point candidates based on cluster division. In FIG. 9, images 61 to 63 are images each obtained by superimposing the representative point candidates determined by the representative point candidate determination unit 37 (371 to 37N) for each type of the feature points on a detection target image Itag with clear indication of the estimated positions of the feature points. The image 64 is an image obtained by superimposing the representative point candidates corresponding to all feature points on the detection target image Itag with clear indication of estimated positions of the feature points. In addition, the image 65 is an image obtained by superimposing the estimated representative points, which are the representative points determined though clustering of the representative point candidates indicated by the image 64 and estimation and selection of representative points for each cluster, on the detection target image Itag with clear indication of the estimated positions of the feature points.

In this case, since there are two target objects (people) of detection in the detection target image Itag, the representative point candidate determination unit 37 determines two representative point candidates for every type of the feature points, and the representative point estimation unit 38 determines k clusters on the basis of an arbitrary clustering technique (e.g., x-means method) that autonomously estimates the number of clusters for all of these representative point candidates. In the example shown in FIG. 9, as shown in the image 64, the representative point estimation unit 38 generates a first cluster of representative point candidates in the broken line frame 66, a second cluster thereof in the broken line frame 67, and a third cluster thereof in the broken line frame 68, respectively.

Then, the representative point estimation unit 38 determines the center point of gravity (also referred to as "cluster gravity center point") of the representative point candidates in each cluster, and selects the estimated representative point(s) from the cluster gravity center points.

In this case, in the first example, for each cluster, the representative point estimation unit 38 counts the number of types of the feature points used for determining the representative point candidates included in the each cluster and selects, as the estimated representative point(s), the cluster gravity center point(s) in which the counted number of types of the feature points is equal to or larger than a predetermined number. On the other hand, the representative point estimation unit 38 determines that a cluster gravity center point for a cluster in which the number of types of the feature points is less than the predetermined number is a point generated by error, and does not use it as an estimated representative point. In this case, the above-described predetermined number is stored in advance in the storage device 2 or the memory 12, for example.

In the second example, the representative point estimation unit 38 selects the estimated representative point based on the feature point scores calculated in the estimation of the feature points. Specifically, the representative point estimation unit 38 calculates the representative value of the feature point scores corresponding to representative point candidates for each cluster, and determines that the cluster gravity center point of such a cluster in which the representative value of the feature point score is equal to or larger than a threshold value is an estimated representative point. Here, examples of the representative value include mean value, minimum value, average value, and mode value. On the other hand, the representative point estimation unit 38 determines that the cluster gravity center point for such a cluster that the representative value of the feature points scores is less than the threshold value is a point generated by error, and does not use it as the estimated representative point. In the second example, the representative point estimation unit 38 may perform weighting using the feature point score even in the calculation of the cluster gravity center point. In this case, the representative point estimation unit 38 calculates the coordinate value of the cluster gravity center point by weighted average of the coordinate values of representative point candidates based on the feature point scores.

Then, in the example shown in FIG. 9, there are three clusters in the image 64, and the representative point estimation unit 38 determines that the cluster gravity center points of two clusters out of these three clusters are the estimated representative points, according to the first example or the second example described above. In this case, the representative point estimation unit 38 recognizes that there are two target objects of detection based on the number of estimated representative points. Thus, according to the process of integrating the representative point candidates based on the cluster division, the representative point estimation unit 38 can suitably calculate the number of target objects of detection and the estimated positions of the representative points.

(5-4) Processing Flow

FIG. 10 is an example of a flowchart illustrating a processing procedure that is executed by the object detection device 3 after learning processing by the learning device 1.

First, the object detection device 3 acquires a detection target image Itag which is an image captured by the camera 4 (step S11). Then, the object detection device 3 generates the feature map Mp on the basis of the detection target image Itag (step S12). In this instance, the feature map output unit 34 of the object detection device 3 generates the feature map Mp by inputting the detection target image Itag into the feature map output model configured by referring to the parameters learned by the learning device 1 from the parameter storage unit 22.

Next, the object detection device 3 calculates a set of the feature point and the representative point pointing vector for each type of the feature points (step S13). In this instance, the feature point estimation unit 35 (351 to 35N) of the object detection device 3 generates the feature point information Ip (Ip1 to IpN) indicating the feature points by inputting the feature points map Mp into a feature point estimation model configured by referring to the parameters learned by the learning device 1 from the parameter storage unit 22. In addition, the vector estimation unit 36 (361 to 36N) generates vector information Iv (Iv1 to IvN) representing the representative point pointing vectors by inputting the feature map Mp into a vector estimation model configured by referring to the parameters learned by the learning device 1 from the parameter storage unit 22.

Next, the object detection device 3 determines the representative point candidate for each set of the feature point and the representative point pointing vector calculated at step S13 (step S14). In this instance, the representative point candidate determination unit 37 (371 to 37N) of the object detection device 3 generates representative point candidate information Ic (Ic1 to IcN) indicating representative point candidate corresponding to each set of the feature point and the representative point pointing vector.

Next, the object detection device 3 estimates the representative point based on the representative point candidates determined at step S14 (step S15). In this case, the representative point estimation unit 38 of the object detection device 3 calculates the estimated representative point for each object based on the representative point candidates through integration and selection of the representative point candidates. Then, the object detection device 3 performs object construction on the basis of the estimated representative point calculated at step S15 (step S16). In this instance, for example, the object construction unit 39 of the object detection device 3 generates the object information indicative of the position and the posture of each object, based on the feature points for each object estimated at step S13 and the estimated representative point for each object estimated at step S15.

As described above, the object detection device 3 performs object construction by estimating the representative point from each feature point. Thus, the object detection device 3 can estimate the representative point from visible feature point information even under a congestion situation in which some feature points could be occluded and hidden by other objects frequently, and accurately make the determination of the presence or absence of the object and the posture estimation.

(6) Modifications

Next, a description will be given of modifications applicable to the example embodiment described above. The following modifications may be implemented in any combination.

(First Modification)

The object detection device 3 may correct the estimated position of each feature point by performing the regression of the position mutually among the feature points for each object after the determination of the estimated representative point.

Figure 11:
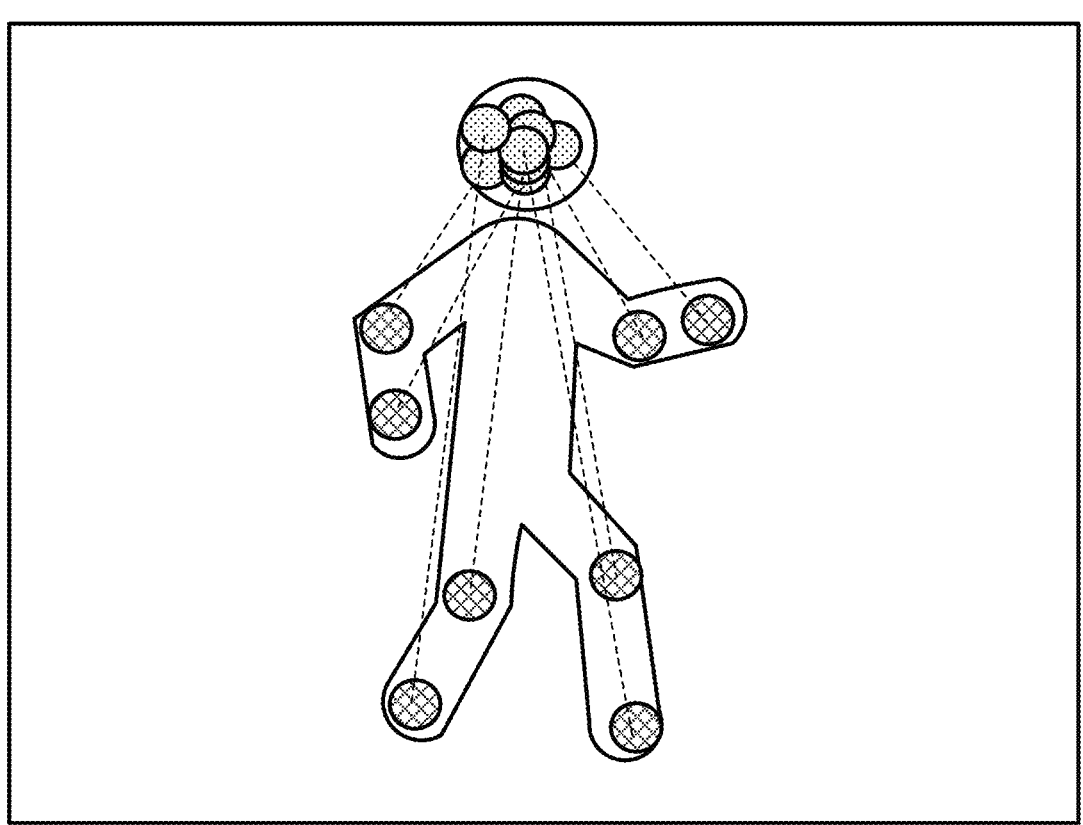
FIG. 11 illustrates an image with clear indication of regression points calculated in a first modification.

FIG. 11 is a diagram showing a detection target image Itag with clear indication of respective feature points and estimated positions (also referred to as "regression points") of a target feature point of correction obtained by regressive approach using other feature points. As shown in FIG. 11, after the determination of the estimated representative point, the object detection device 3 classifies the feature points estimated by the feature point estimation unit 15 for each object and performs regression of the position mutually among the feature points for each object. In the example shown in FIG. 11, the object detection device 3 determines a target feature point of correction to be a joint point representing the head, and calculates regression points for the joint point from other feature points (in this case, eight joint points) of the same object, respectively. In this case, the parameters relating to a model for calculating the regression point of a feature point from any other each feature point are stored in advance in the storage device 2 or the memory 12, and the object detection device 3 performs calculation of the regression points by using the model configured based on these parameters.

Next, the object detection device 3 calculates the corrected position of the target feature point of correction by integrating the regression points (in this case, eight regression points) calculated from the other feature points and the pre-correction (original) position of the target feature point of the correction. For example, the object detection device 3 calculates the corrected position of the target feature point of correction to be the position of the center of gravity of the regression points and the pre-correction position of the target feature point of correction.

Then, the object detection device 3 regards every feature point as a target feature point of correction in order, and corrects the estimated positions of the respective feature points by the feature point estimation unit 15 using the regression points calculated from any other feature points. Thus, according to this modification, the object detection device 3 can suitably correct the estimated position of each feature point calculated by the feature point estimation unit 15.

(Second Modification)

The process of the flowchart shown in FIG. 10 is suitably applied to a process of detecting a rectangular area (Bounding Box) indicating an area where an object exists from the detection target image Itag.

Figures 12A, 12B, 12C:
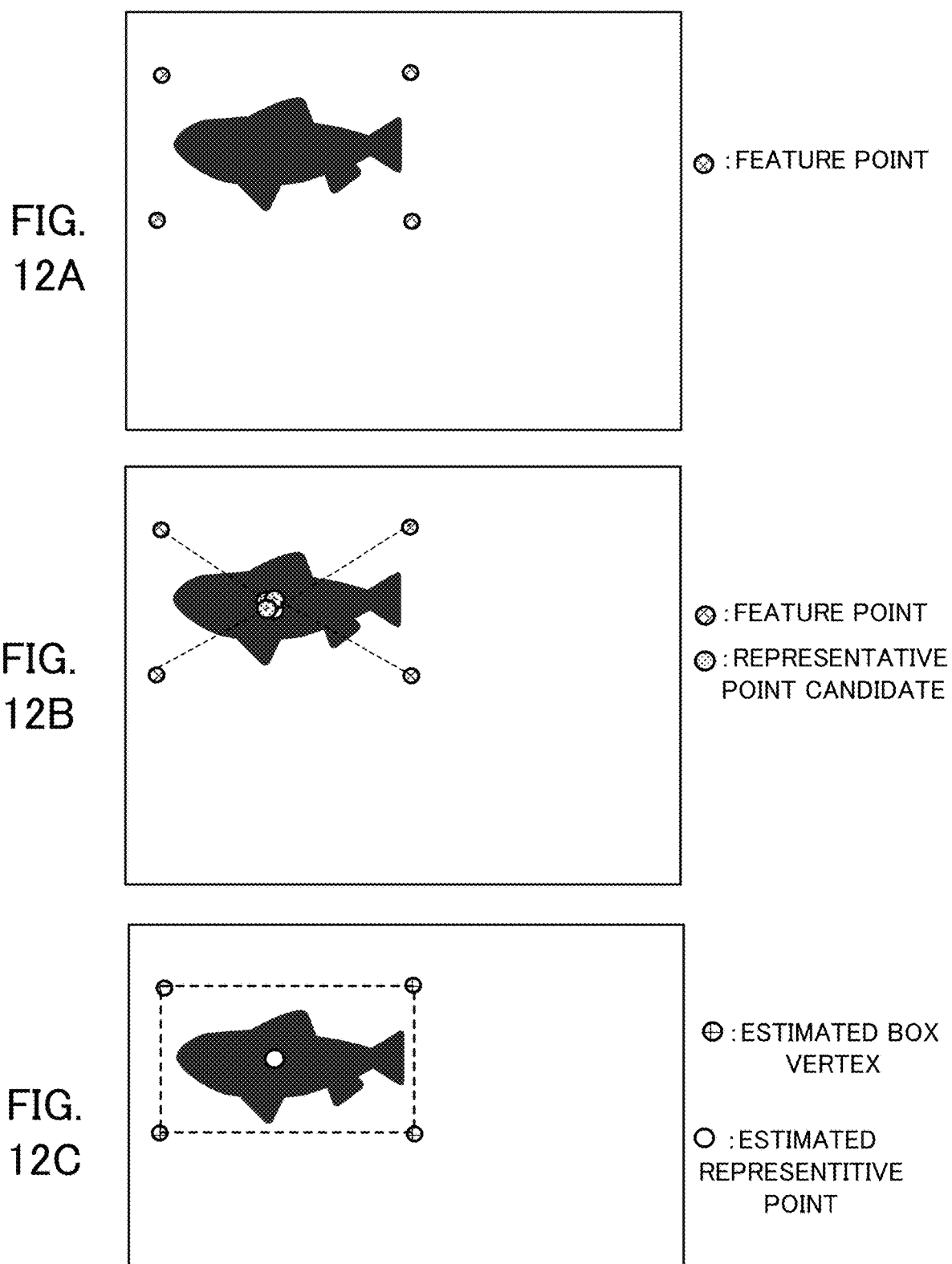
FIG. 12A illustrates an image with clear indication of estimated feature points when the box vertices are estimated as feature points.
FIG. 12B illustrates an image with clear indication of representative point candidates.
FIG. 12C illustrates an image with clear indication of an estimated representative point determined from representative point candidates and estimated box vertices that are estimates of the box vertices.

FIG. 12A is a diagram showing a detection target image Itag with clear indication of estimated feature points that are estimated four vertices (also referred to as "box vertices") defining the bounding box of a target object of detection. Further, FIG. 12B is a diagram showing the detection target image Itag with clear indication of representative point candidates determined from the respective feature points. In addition, FIG. 12C is a diagram showing the detection target image Itag with clear indication of the estimated representative point determined from the representative point candidates and the estimated box vertex.

In this instance, first, the object detection device 3 acquires the detection target image Itag at step S11 and generates the feature map Mp therefrom, and then, at step S13, estimates four types of the feature points (see FIG. 12A) and the representative point pointing vectors which correspond to the box vertices. Furthermore, at step S14, the object detection device 3 determines the representative point candidates corresponding to the feature points based on the process result at step S13 (see FIG. 12B). Then, the representative point estimation unit 38 of the object detection device 3 determines the estimated representative point from the determined representative point candidates at step S15, and the object construction unit 39 further determines the estimated box vertices from the determined estimated representative point at step S16 (see FIG. 12C). It is noted that a method of estimating individual feature points from the representative point of an object is disclosed in, for example, Non-Patent Literature 1.

Further, the process of the flowchart shown in FIG. 10 is suitably applied to Instance Segmentation which is a process of detecting an area of each individual object from the detection target image Itag.

Figures 13A, 13B, 13C:
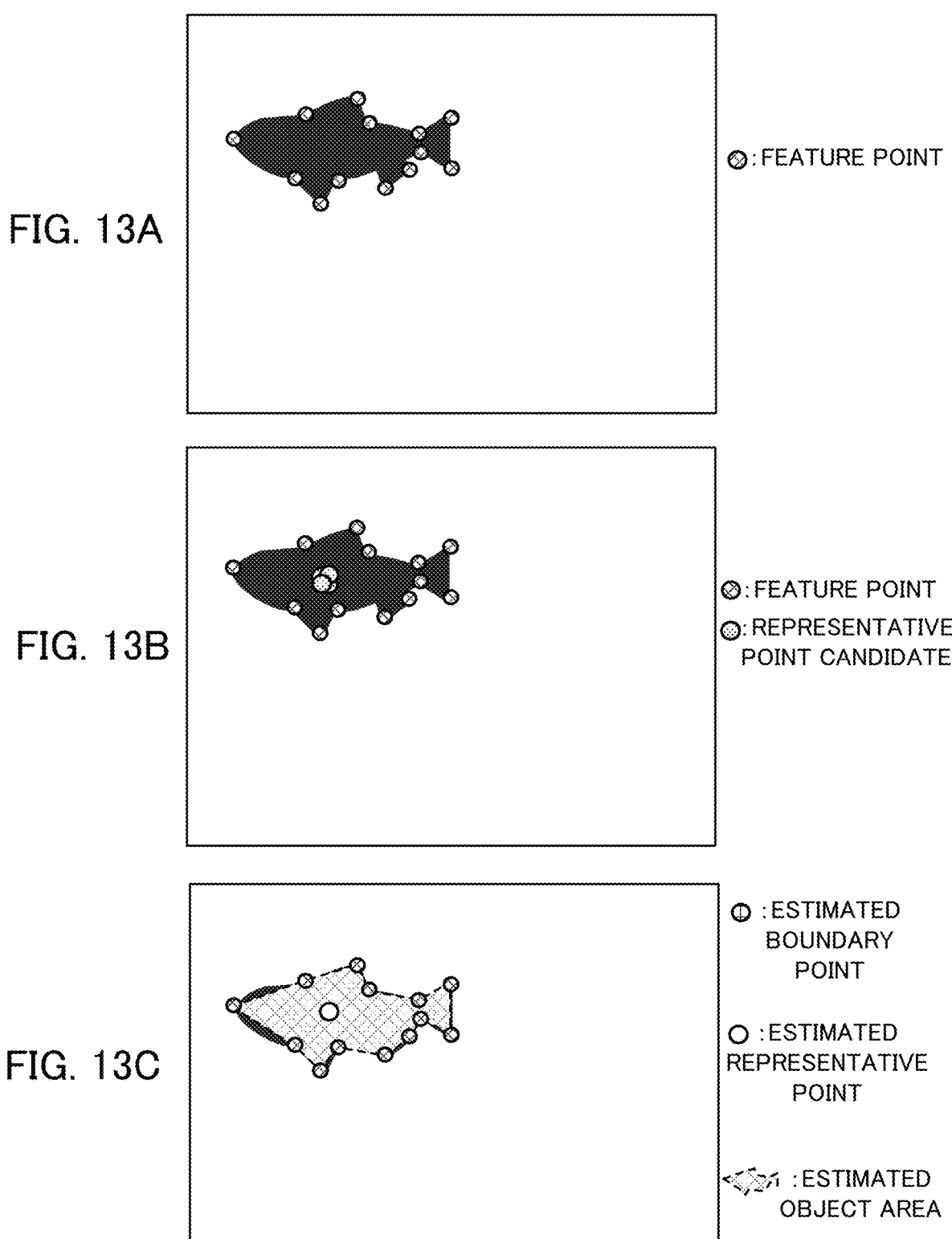
FIG. 13A illustrates an image with clear indication of estimated feature points when the boundary points of a target object of detection are estimated as the feature points.
FIG. 13B illustrates an image with clear indication of representative point candidates.
FIG. 13C illustrates an image with clear indication of an estimated representative point determined from representative point candidates, estimated boundary points, and an estimated object area.

FIG. 13A is a diagram showing the detection target image Itag with clear indication of estimated feature points when the boundary points of a target object of detection are estimated as the feature points. In addition, FIG. 13B is a diagram showing the detection target image Itag with clear indication of representative point candidates determined from the feature points. In addition, FIG. 13C is a diagram showing the detection target image Itag with clear indication of the estimated representative point determined from the representative point candidates and the boundary points and the object area estimated from the estimated representative point.

In this instance, first, the object detection device 3 acquires the detection target image Itag at step S11 and generates the feature map Mp therefrom, and then, at step S13, estimates multiple types of boundary points (see FIG. 13A) of the object and the representative point pointing vectors. Furthermore, at step S14, the object detection device 3 determines the representative point candidates corresponding to the respective feature points based on the process result at step S13 (see FIG. 13B). Then, the representative point estimation unit 38 of the object detection device 3 determines the estimated representative point from the determined representative point candidates at step S15, and the object construction unit 39 further estimates the boundary points and the object area from the determined estimated representative point at step S16 (see FIG. 12C). In this case, after estimating the boundary points from the estimated representative point, the object construction unit 39 estimates the area surrounded by the estimated boundary points as the object area.

In this way, the object detection device 3 can suitably perform an estimation regarding an area on an image to which an object belongs, such as a detection process of the bounding box and Instance Segmentation.

Second Example Embodiment

Figure 14:
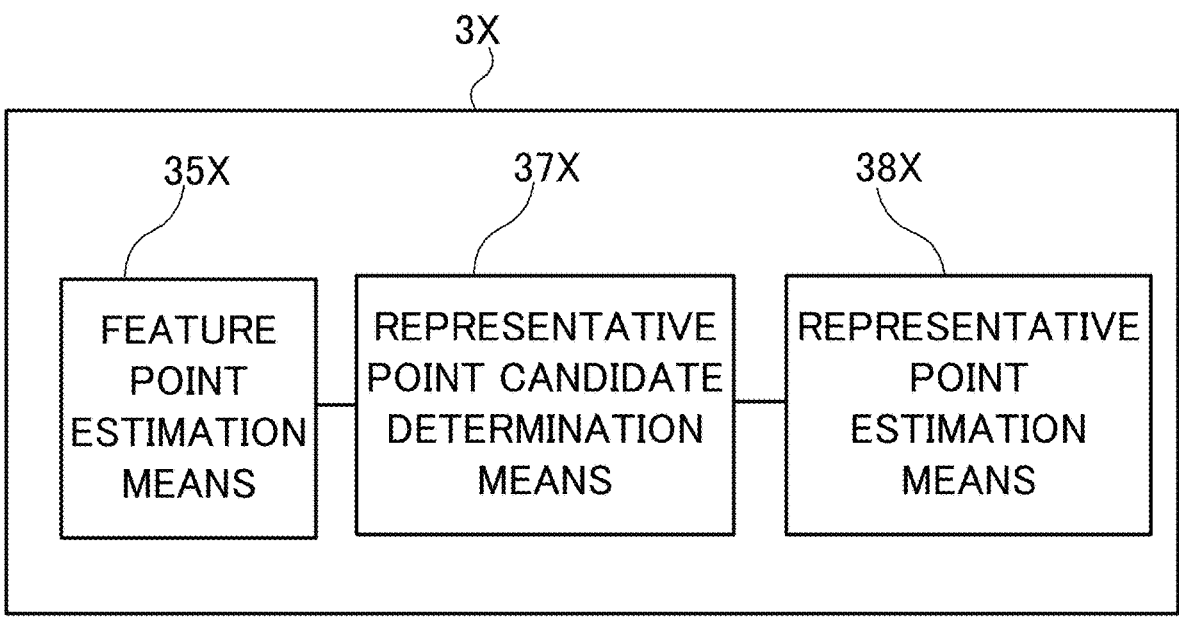
FIG. 14 illustrates a schematic configuration of the estimation device according to a second example embodiment.

FIG. 14 shows a schematic configuration of an estimation device 3X according to a second example embodiment. The estimation device 3X mainly includes a feature point estimation means 35X, a representative point candidate determination means 37X, and a representative point estimation means 38X. The estimation device 3X may be configured by a plurality of devices. Examples of the estimation device 3X include the object detection device 3 in the first example embodiment.

The feature point estimation means 35X is configured to estimate plural feature points relating to an object. Examples of the feature point estimation means 35X include the feature point estimation units 351 to 35N (see FIG. 5) and the feature point estimation unit 35 (see FIG. 6) in the first example embodiment.

The representative point candidate determination means 37X is configured to determine plural representative point candidates that are candidates of a representative point of the object based on the plural feature points. Examples of the representative point candidate determination means 37X include the representative point candidate determination units 371 to 37N in the first example embodiment (see FIG. 5) and the representative point candidate determination unit 37 (see FIG. 6). The representative point estimation means 38X is configured to estimate the representative point based on the plural representative point candidates. Examples of the representative point estimation means 38X include the representative point estimation unit 38 in the first example embodiment.

Figure 15:
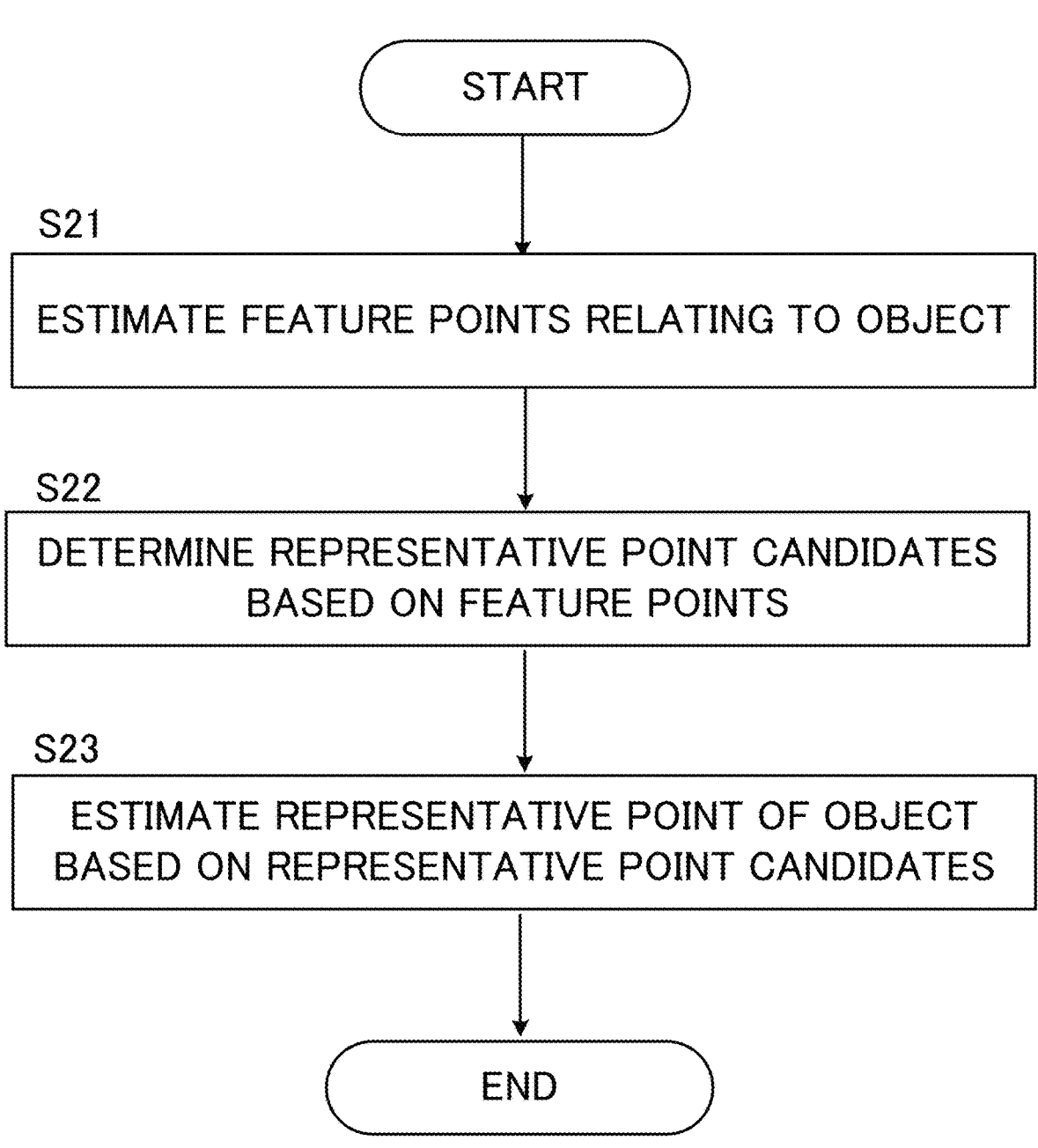
FIG. 15 illustrates an example of a flowchart showing a processing procedure to be executed by the estimation device in the second example embodiment.

FIG. 15 is an exemplary flowchart illustrating a process to be executed by the estimation device 3X in the second example embodiment. The feature point estimation means 35X estimates plural feature points relating to an object (step S21). The representative point candidate determination means 37X determines plural representative point candidates that are candidates of a representative point of the object based on the plural feature points (step S22). Then, the representative point estimation means 38X estimates the representative point based on the plural representative point candidates (step S23).

According to the second example embodiment, the estimation device 3X can estimate the representative point of the object with high accuracy even when a part of the object is hidden in photographing the object.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1 Learning device
2 Storage device
3 Object detection device
3X Estimation device
4 Camera
11, 31 Processor
12, 32 Memory
13, 33 Interface
21 Training data storage unit

19

22 Parameter storage section
100 Object detection system
What is claimed is:

1. An estimation device comprising:
at least one memory configured to store instructions; and
at least one processor configured to execute the instructions to:
  generate a feature map from an input image by using a trained feature map output model;
  estimate plural feature points which are respective positions of distinctive parts in a detection target for an object included in the input image, based on the feature map by using a trained feature point estimation model;
  estimate, for each of the plural feature points, a vector from the feature point to a representative point of the object based on the feature map by using a trained vector estimation model;
  determine plural representative point candidates that are candidates of a representative point based on sets of the each of the plural feature points and the vector;
  generate, for each of the plural representative point candidates, a reliability map indicating a distribution of confidence having a peak at a position of the representative point candidate; and
  estimate the representative point based on a cumulative map obtained by summing up reliability maps relative to respective positions of the plural representative point candidates, wherein the representative point is estimated based on a position of a peak detected in the cumulative map.

2. The estimation device according to claim 1,
wherein the at least one processor is configured to execute the instructions to estimate the number of the object(s) and estimates the representative point for each of the objects when there are plural objects in the image.

3. The estimation device according to claim 1,
wherein the at least one processor is configured to execute the instructions to estimate the representative point based on a center of gravity of the representative point candidates per cluster identified by performing clustering on the plural representative point candidates.

4. The estimation device according to claim 3,
wherein the at least one processor is configured to execute the instructions to select the representative point from the center of gravity, based on the number of types of feature points corresponding to the representative point candidates per cluster or scores indicating certainty of the feature points.

5. The estimation device according to claim 1,
wherein, for each estimated representative point which is an estimate of the representative point, the at least one processor is configured to execute the instructions to calculate estimated positions obtained through mutual position estimation among the feature points used for estimating the estimated representative points, and corrects estimation results of the feature points based on the estimated positions.

6. The estimation device according to claim 1,
wherein the at least one processor is configured to further execute the instructions to perform estimation on a posture of the object or an area on the image to which the object belongs, based on the estimated representative point which is an estimate of the representative point.

7. An estimation method executed by a computer, the estimation method comprising:

generating a feature map from an input image by using a trained feature map output model;
estimating plural feature points which are respective positions of distinctive parts in a detection target for an object included in the input image, based on the feature map by using a trained feature point estimation model;
estimating, for each of the plural feature points, a vector from the feature point to a representative point of the object based on the feature map by using a trained vector estimation model;
determining plural representative point candidates that are candidates of a representative point based on sets of the each of the plural feature points and the vector;
generating, for each of the plural representative point candidates, a reliability map indicating a distribution of confidence having a peak at a position of the representative point candidate; and
estimating the representative point based on a cumulative map obtained by summing up reliability maps relative to respective positions of the plural representative point candidates, wherein the representative point is estimated based on a position of a peak detected in the cumulative map.

8. A non-transitory computer readable storage medium storing a program executed by a computer, the program causing the computer to:
  generate a feature map from an input image by using a trained feature map output model;
  estimate plural feature points which are respective positions of distinctive parts in a detection target for an object included in the input image, based on the feature map by using a trained feature point estimation model;
  estimate, for each of the plural feature points, a vector from the feature point to a representative point of the object based on the feature map by using a trained vector estimation model;
  determine plural representative point candidates that are candidates of a representative point based on sets of the each of the plural feature points and the vector;
  generate, for each of the plural representative point candidates, a reliability map indicating a distribution of confidence having a peak at a position of the representative point candidate; and
  estimate the representative point based on a cumulative map obtained by summing up reliability maps relative to respective positions of the plural representative point candidates, wherein the representative point is estimated based on a position of a peak detected in the cumulative map.

9. The estimation device according to claim 1,
wherein the at least one processor is configured to execute the instructions to perform decision making to determine, for each of the plural feature points, an object to which the feature point belongs based on the estimated representative point, and generate object information representing a position and a posture of the object based on a result of the decision making.

10. The estimation device according to claim 1,
wherein at least one of the trained feature map output model, the trained feature point estimation model, and the trained vector estimation model is a machine learning model trained using training data including an input image and correct answer data regarding feature points of an object in the input image.

11. The estimation device according to claim 1,
wherein the distribution of confidence in each reliability
map includes a Gaussian distribution having a peak at
the position of the representative point candidate.

12. The estimation device according to claim 1,
wherein the at least one processor is configured to execute
the instructions to:

set a maximum value of the distribution of confidence
in the reliability map based on a score indicating
certainty of estimation of a corresponding feature
point; and determine the representative point as a position of a
peak satisfying a predetermined condition including
at least one of:

(i) a reliability value in the cumulative map at the
peak being equal to or greater than a predetermined value, or (ii) a number of types of feature points corresponding to representative point candidates whose reliability at the peak is equal to or greater than a
threshold value being equal to or greater than a
predetermined number.

\* \* \* \* \*